US012659557B2

(12) United States Patent
Usami et al.

(10) Patent No.: US 12,659,557 B2
(45) Date of Patent: Jun. 16, 2026

(54) IMAGE PROCESSING APPARATUS, IMAGE PICKUP APPARATUS, AND IMAGE PROCESSING METHOD

(71) Applicant: CANON KABUSHIKI KAISHA, Tokyo (JP)

(72) Inventors: Takahiro Usami, Tokyo (JP); Toru Aida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/828,488

(22) Filed: Sep. 9, 2024

(65) Prior Publication Data

US 2024/0430547 A1     Dec. 26, 2024

Related U.S. Application Data

(63) Continuation of application No. PCT/JP2023/014552, filed on Apr. 10, 2023.

(30) Foreign Application Priority Data

Apr. 18, 2022    (JP) ................................. 2022-068088
Mar. 29, 2023    (JP) ................................. 2023-052518

(51) Int. Cl.
H04N 23/11          (2023.01)
H04N 23/63          (2023.01)

(52) U.S. Cl.
CPC ........... H04N 23/11 (2023.01); H04N 23/633 (2023.01)

(58) Field of Classification Search
CPC ...... H04N 23/11; H04N 23/633; H04N 23/60; H04N 23/61; H04N 23/45; H04N 23/67

(Continued)

(56) References Cited

U.S. PATENT DOCUMENTS

2020/0045247 A1*    2/2020    Okamoto ............... H04N 5/265
2020/0154087 A1*    5/2020    Numata ................. H04N 23/11
(Continued)

FOREIGN PATENT DOCUMENTS

JP          2011066809 A  *  3/2011
JP          2017212544 A  *  11/2017
(Continued)

OTHER PUBLICATIONS

Oct. 31, 2024 PCT/IB/338 (PCT Notification of Transmittal of Translation of the International Preliminary Report on Patentability) from International Application No. PCT/JP2023/014552.
(Continued)

*Primary Examiner* — Thai Q Tran
*Assistant Examiner* — Stephen R Smith
(74) *Attorney, Agent, or Firm* — Cowan, Liebowitz & Latman, P.C.

(57)          ABSTRACT

An image processing apparatus includes a detector configured to detect at least one object included in at least one of visible light image data and non-visible light image data that are generated by imaging, and a processor configured to determine a tracking object from the at least one object, to generate combined image data by combining the visible light image data and the non-visible light image data, and to track the tracking object by using the combined image data. The processor combines the visible light image data and the non-visible light image data in accordance with information related to the at lease one object detected by the detector.

18 Claims, 19 Drawing Sheets

(58) Field of Classification Search
    USPC .................................. 348/164, 143; 382/159
    See application file for complete search history.

(56) References Cited

U.S. PATENT DOCUMENTS

| | | | |
|---|---|---|---|
| 2020/0294214 A1* | 9/2020 | Numata ................. | H04N 23/95 |
| 2021/0342648 A1* | 11/2021 | Richards .............. | G06V 10/143 |
| 2023/0196739 A1* | 6/2023 | Kida ...................... | G06V 10/20 |
| | | | 382/159 |
| 2023/0306712 A1* | 9/2023 | Lee ........................ | H04N 23/90 |

FOREIGN PATENT DOCUMENTS

| | | | |
|---|---|---|---|
| JP | 2019118043 A | 7/2019 | |
| JP | 2020022088 A | 2/2020 | |
| JP | 2020080458 A | 5/2020 | |
| JP | 2022021869 A | 2/2022 | |
| JP | 2022057784 A | 4/2022 | |

OTHER PUBLICATIONS

Jan. Oct. 31, 2024 PCT/IB/373 (PCT International Preliminary Report on Patentability) from International Application No. PCT/JP2023/014552.
Oct. 31, 2024 PCT/ISA/237 (PCT Written Opinion of the International Searching Authority) from International Application No. PCT/JP2023/014552.
Foreign Patent Documents #1-2 and 4-7 were cited in the International Search Report dated Jun. 13, 2023, of International Application No. PCT/JP2023/014552.

* cited by examiner

| ID | TYPE | VISIBLE LIGHT SIDE WEIGHT | NON-VISIBLE LIGHT SIDE WEIGHT |
|---|---|---|---|
| 601 | PERSON (BRIGHT CLOTHING) | 10 | 0 |
| 602 | PERSON (DARK CLOTHING) | 0 | 10 |
| 603 | CAR/MOTORCYCLE | 0 | 20 |
| 604 | TRAIN | 0 | 20 |
| 605 | AIRPLANE | 0 | 20 |
| 606 | ANIMAL (BRIGHT FUR) | 10 | 0 |
| 607 | ANIMAL (DARK FUR) | 0 | 10 |
| 608 | BUTTERFLY | 0 | 10 |
| 609 | FLOWER/FRUIT | 10 | 0 |
| 610 | BUILDING | 0 | 20 |

FIG. 6

| ID | BACKGROUND AREA | VISIBLE LIGHT SIDE WEIGHT | NON-VISIBLE LIGHT SIDE WEIGHT |
|---|---|---|---|
| 701 | NIGHT SCENE | 0 | 30 |
| 702 | EVENING SCENE | 0 | 10 |
| 703 | DAYTIME SCENE | 30 | 0 |
| 704 | OTHER (BRIGHT) | 10 | 0 |
| 705 | OTHER (DARK) | 0 | 10 |

| ID | SURROUNDING AREA | VISIBLE LIGHT SIDE WEIGHT | NON-VISIBLE LIGHT SIDE WEIGHT |
|---|---|---|---|
| 706 | GRASS/PLANT | 20 | 0 |
| 707 | BLUE SKY | 0 | 20 |
| 708 | CLOUD | 10 | 0 |
| 709 | GROUND | 0 | 10 |
| 710 | ROAD | 0 | 10 |

| ID | SURROUNDING OBJECT TYPE | VISIBLE LIGHT SIDE WEIGHT | NON-VISIBLE LIGHT SIDE WEIGHT |
|---|---|---|---|
| 711 | BRANCH/LEAF | 20 | 0 |

FIG. 7

| ID | TRACKING OBJECT INFORMATION | VISIBLE LIGHT SIDE WEIGHT | NON-VISIBLE LIGHT SIDE WEIGHT |
|---|---|---|---|
| 801 | COLOR DISPERSION: LARGE | 20 | 0 |
| 802 | COLOR DISPERSION: SMALL | 0 | 10 |
| 803 | LUMINANCE DISPERSION: LARGE | 10 | 0 |
| 804 | LUMINANCE DISPERSION: SMALL | 0 | 10 |
| 805 | SPATIAL FREQUENCY: HIGH | 10 | 0 |
| 806 | SPATIAL FREQUENCY: LOW | 0 | 10 |
| 807 | EDGE AMOUNT: LARGE | 10 | 0 |
| 808 | EDGE AMOUNT: SMALL | 0 | 10 |
| 809 | NUMBER OF FEATURE POINTS: LARGE | 20 | 0 |
| 810 | NUMBER OF FEATURE POINTS: SMALL | 0 | 10 |

FIG. 8

| ID | NUMBER OF PRIORITY OBJECTS | VISIBLE LIGHT SIDE WEIGHT | NON-VISIBLE LIGHT SIDE WEIGHT |
|---|---|---|---|
| 901 | VISIBLE LIGHT SIDE: LARGE | (5 x DIFFERENCE) | 0 |
| 902 | NON-VISIBLE LIGHT SIDE: LARGE | 0 | (5 x DIFFERENCE) |

| ID | | VISIBLE LIGHT SIDE WEIGHT | NON-VISIBLE LIGHT SIDE WEIGHT |
|---|---|---|---|
| 903 | NUMBER OF PRIORITY OBJECTS | (5 x VISIBLE LIGHT SIDE NUMBER) | (5 x NON-VISIBLE LIGHT SIDE NUMBER) |

| ID | | VISIBLE LIGHT SIDE WEIGHT | NON-VISIBLE LIGHT SIDE WEIGHT |
|---|---|---|---|
| 904 | NUMBER OF PRIORITY OBJECTS | 10 IF VISIBLE LIGHT SIDE NUMBER EXCEEDS THRESHOLD | 10 IF NON-VISIBLE LIGHT SIDE NUMBER EXCEEDS THRESHOLD |

FIG. 9

| ID | TRACKING OBJECT INFORMATION | VISIBLE LIGHT SIDE WEIGHT | NON-VISIBLE LIGHT SIDE WEIGHT |
|---|---|---|---|
| 1001 | LUMINANCE DISPERSION<br>VISIBLE LIGHT ≥ NON-VISIBLE LIGHT | 10 | 0 |
| 1002 | LUMINANCE DISPERSION<br>VISIBLE LIGHT < NON-VISIBLE LIGHT | 0 | 10 |
| 1003 | SPATIAL FREQUENCY: HIGH<br>VISIBLE LIGHT ≥ NON-VISIBLE LIGHT | 20 | 0 |
| 1004 | SPATIAL FREQUENCY: HIGH<br>VISIBLE LIGHT < NON-VISIBLE LIGHT | 0 | 20 |
| 1005 | EDGE AMOUNT<br>VISIBLE LIGHT ≥ NON-VISIBLE LIGHT | 10 | 0 |
| 1006 | EDGE AMOUNT<br>VISIBLE LIGHT < NON-VISIBLE LIGHT | 0 | 10 |
| 1007 | NUMBER OF FEATURE POINTS<br>VISIBLE LIGHT ≥ NON-VISIBLE LIGHT | 20 | 0 |
| 1008 | NUMBER OF FEATURE POINTS<br>VISIBLE LIGHT < NON-VISIBLE LIGHT | 0 | 20 |

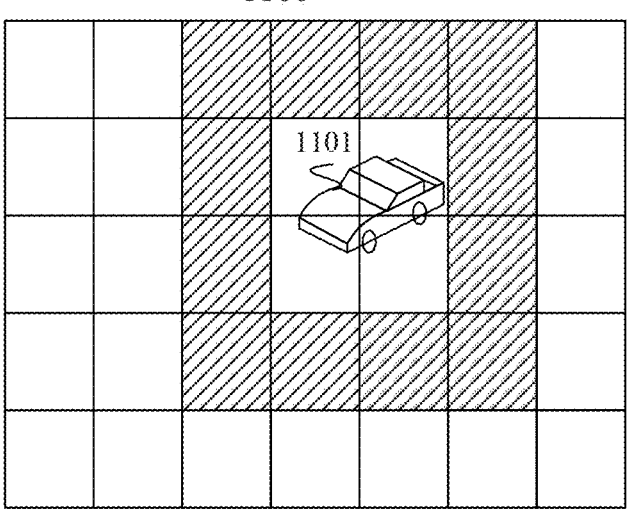

IMAGE PROCESSING APPARATUS, IMAGE PICKUP APPARATUS, AND IMAGE PROCESSING METHOD

CROSS-REFERENCE TO RELATED APPLICATIONS

This application is a Continuation of International Patent Application No. PCT/JP2023/014552, filed on Apr. 10, 2023, which claims the benefit of Japanese Patent Application Nos. 2022-068088, filed on Apr. 18, 2022, and 2023-052518, filed on Mar. 29, 2023, which are hereby incorporated by reference herein in their entirety.

BACKGROUND

Technical Field

The present disclosure relates to a technology of tracking an object to be imaged.

Description of Related Art

Technologies applied to an image pickup apparatus such as a monitoring camera detect track an object at night, in dark areas, or the like by using image data obtained by imaging non-visible light such as infrared light in addition to an image obtained by imaging visible light. An image pickup apparatus of Japanese Patent Laid-open No. 2019-118043 selects, based on the result of object detection using at least one of visible light image data and non-visible light image data, whether to output the visible light image data, the non-visible light image data, or combined image data obtained by combining the visible light image data and the non-visible light image data.

However, the combined image data output from the image pickup apparatus of Japanese Patent Laid-open No. 2019-118043 is image data obtained by extracting details of an object detected with non-visible light and superimposing the details on a visible light image or is image data obtained by combining a non-visible light image as the foreground with a visible light image as the background. Thus, the combined image data is not suitable for the purpose of tracking an object subjected to automatic focusing (AF).

SUMMARY

One of the aspects of the present disclosure provides an image processing apparatus and the like, each of which can realize good tracking of objects.

An image processing apparatus according to one aspect of the present disclosure includes a detector configured to detect at least one object included in at least one of visible light image data and non-visible light image data that are generated by imaging, and a processor configured to determine a tracking object from the at least one object, to generate combined image data by combining the visible light image data and the non-visible light image data, and to track the tracking object by using the combined image data. The processor combines the visible light image data and the non-visible light image data in accordance with information related to the at lease one object detected by the detector.

Further features of the disclosure will become apparent from the following description of embodiments with reference to the attached drawings.

2

Figure 2:
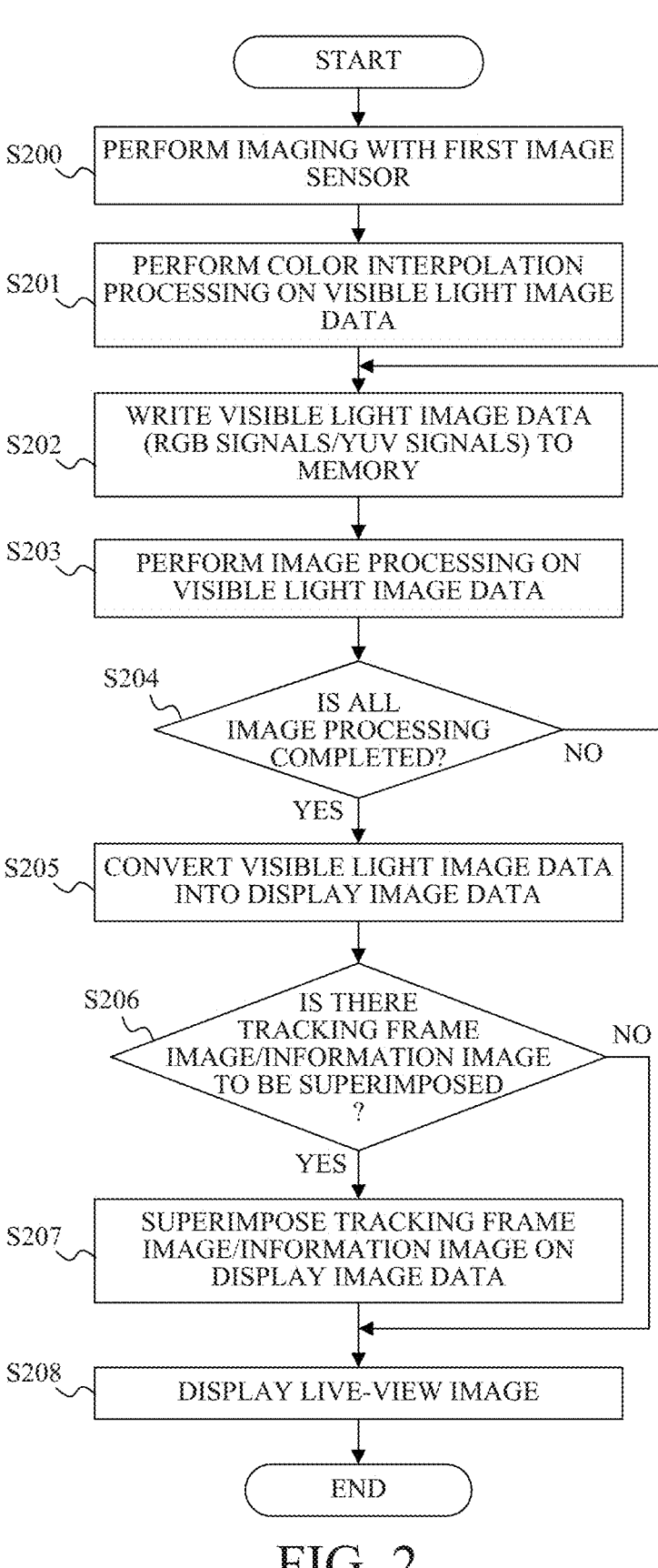

FIG. 2 is a flowchart illustrating display processing executed in Example 1.

Figure 3A:
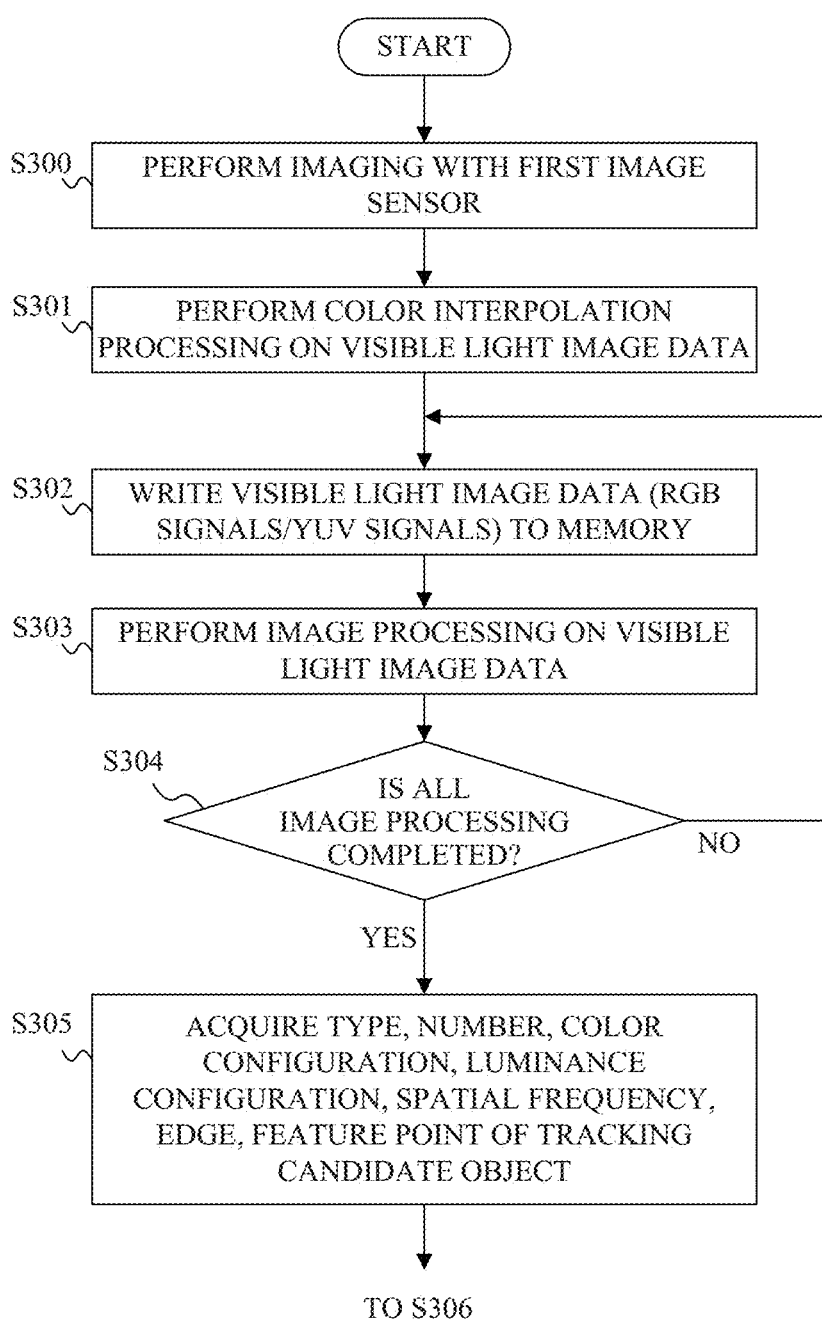
Figure 3B:
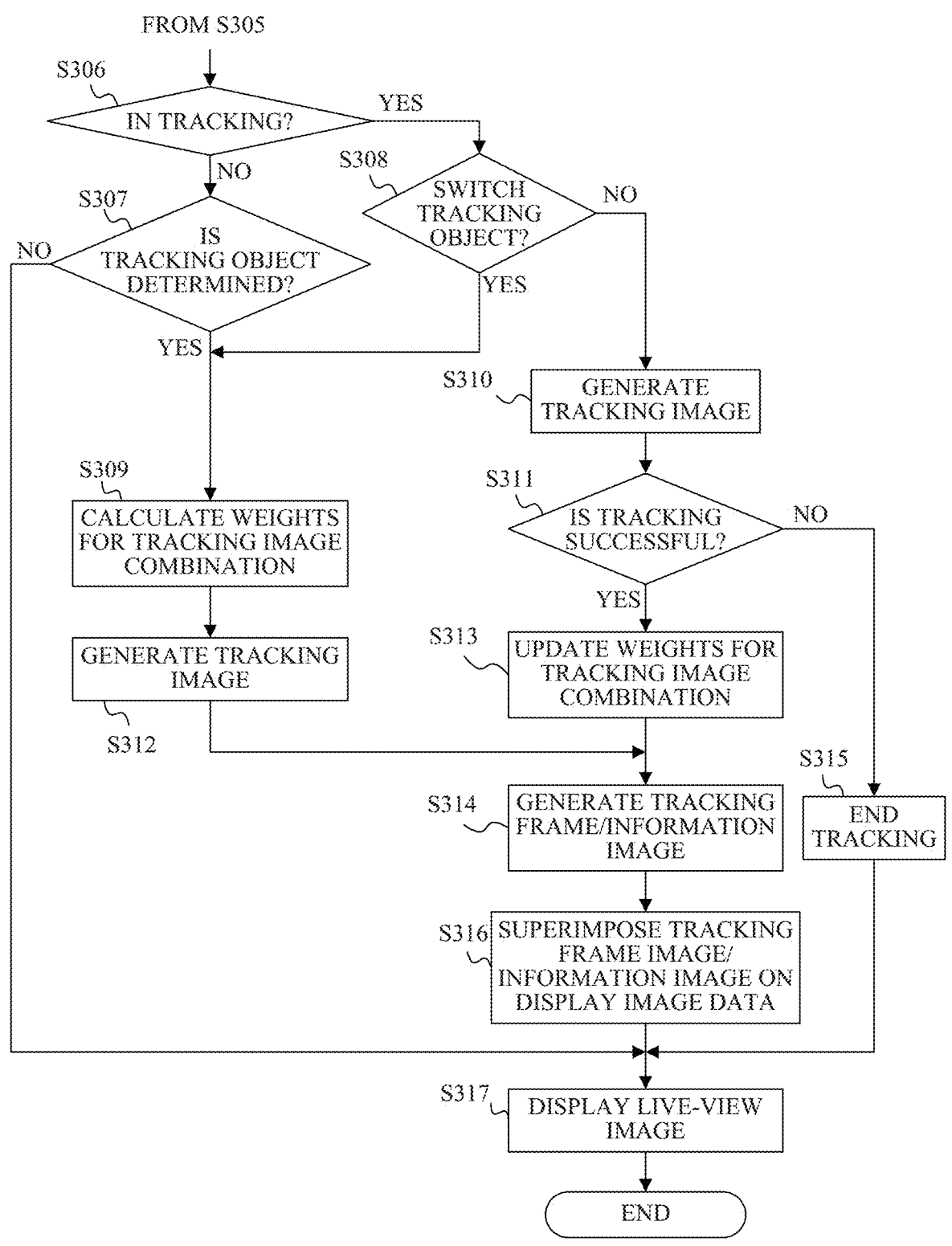

FIGS. 3A and 3B are flowcharts illustrating tracking processing executed in Example 1.

Figure 4:
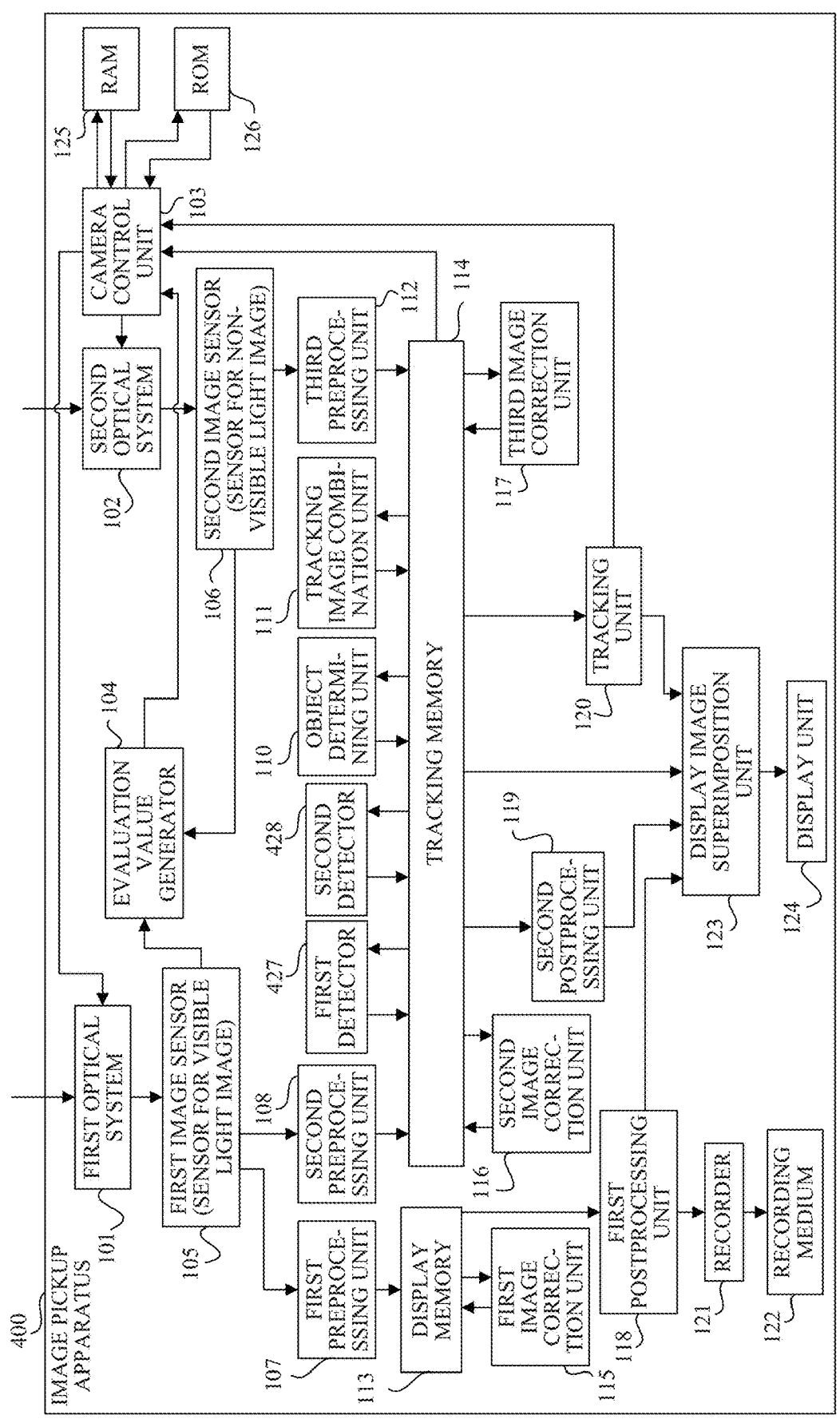

FIG. 4 is a block diagram illustrating the configuration of an image pickup apparatus of Example 2.

Figure 5:
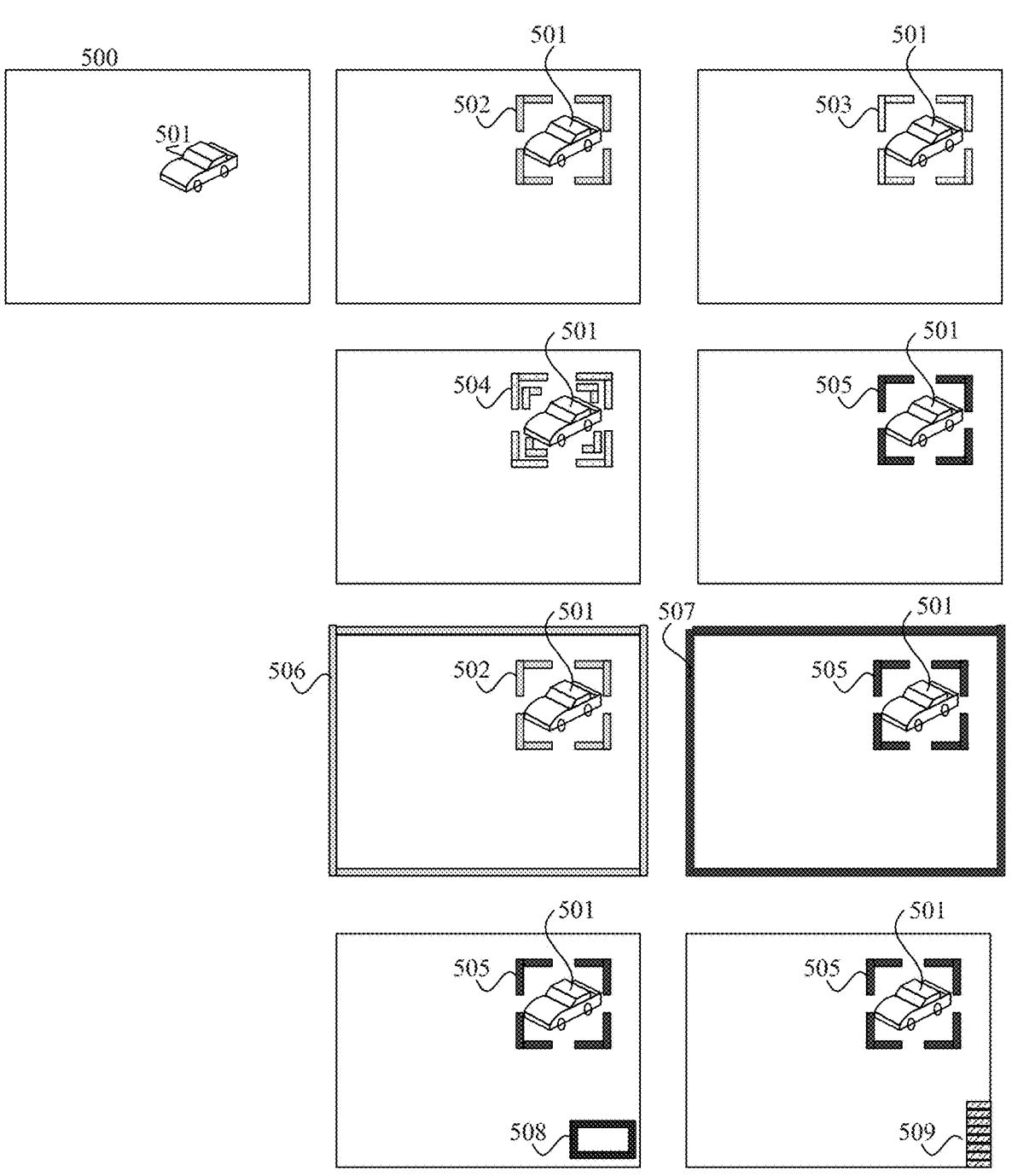

FIG. 5 is a diagram illustrating examples of a display image in Example 1.

FIG. 6 is a diagram illustrating an example of weight contribution values in image combination for each tracking object in Example 1.

FIG. 7 is a diagram illustrating an example of weight contribution values in image combination for each of a background, a surrounding area of a tracking object, and a surrounding object of the tracking object in Example 1.

FIG. 8 is a diagram illustrating an example of weight contribution values in image combination based on tracking object information in Example 1.

FIG. 9 is a diagram illustrating an example of weight contribution values in image combination based on the number of priority objects in visible light detection and the number of priority objects in non-visible light detection in Example 2.

FIG. 10 is a diagram illustrating an example of weight contribution values in image combination based on tracking object information in visible light detection and tracking object information in non-visible light detection in Example 2.

FIG. 11 is a diagram illustrating an example of surrounding areas of a tracking object in Example 1.

Figure 12A:
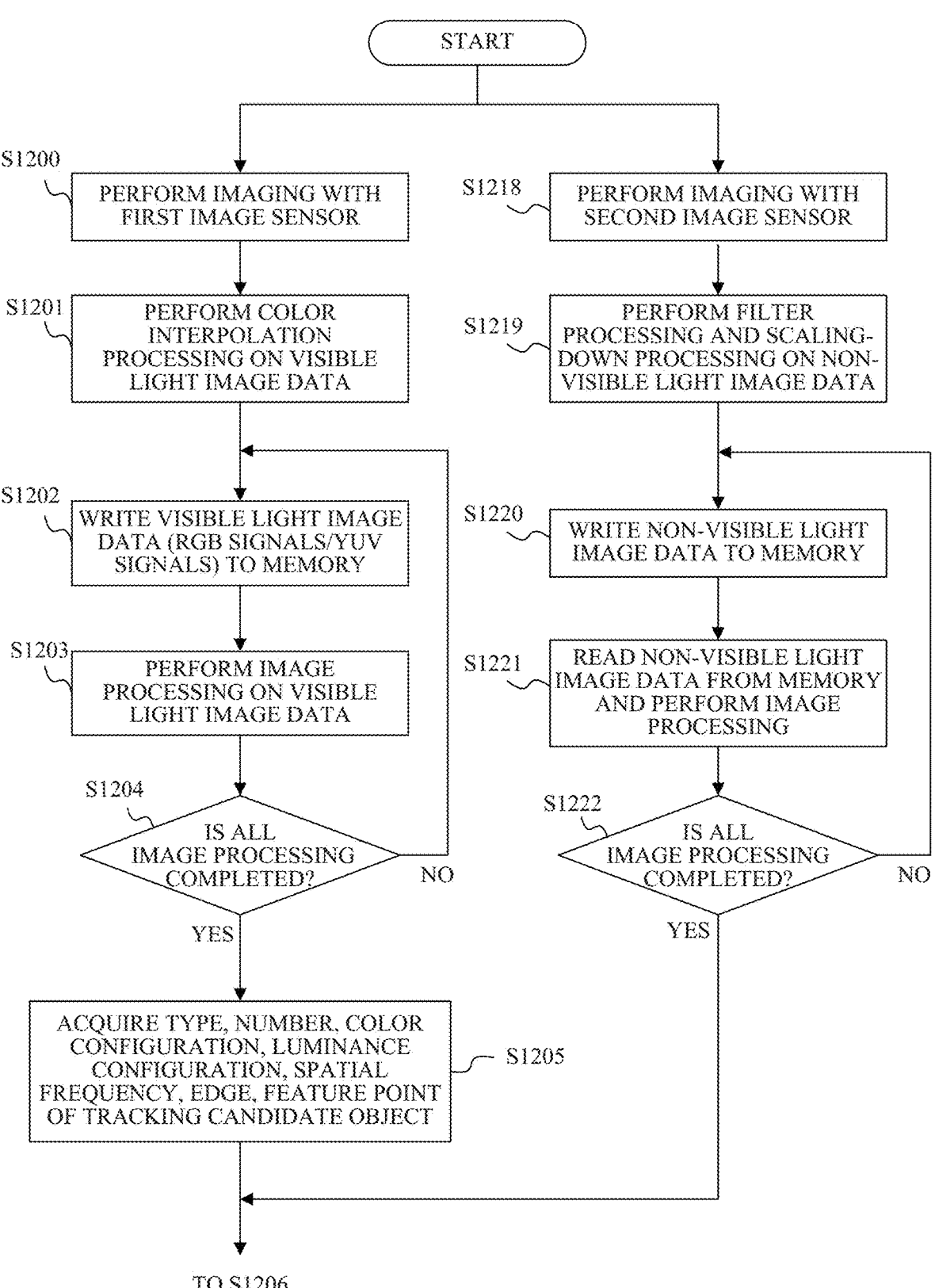
Figure 12B:
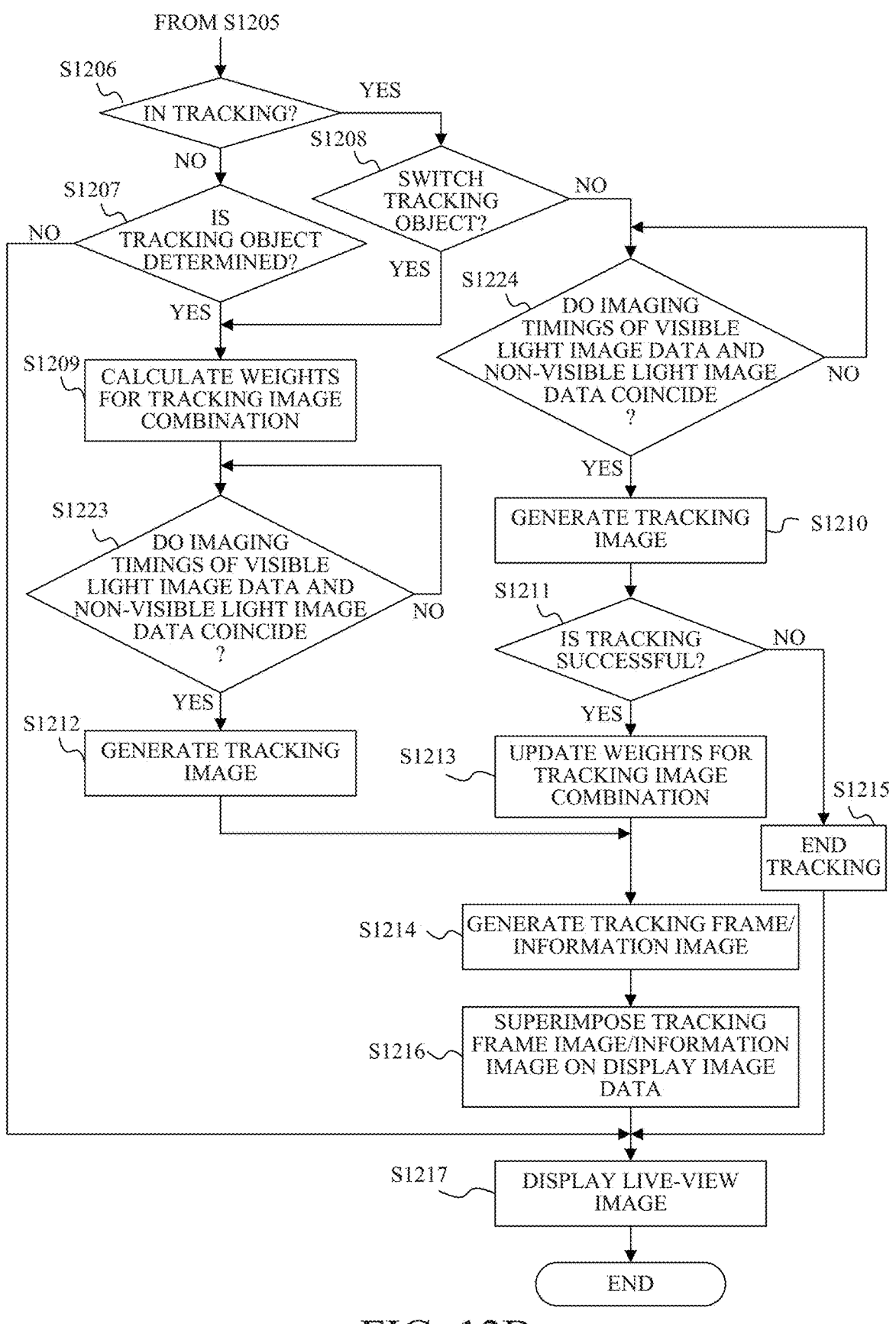

FIGS. 12A and 12B are flowcharts illustrating tracking processing executed in Example 3.

Figure 13A:
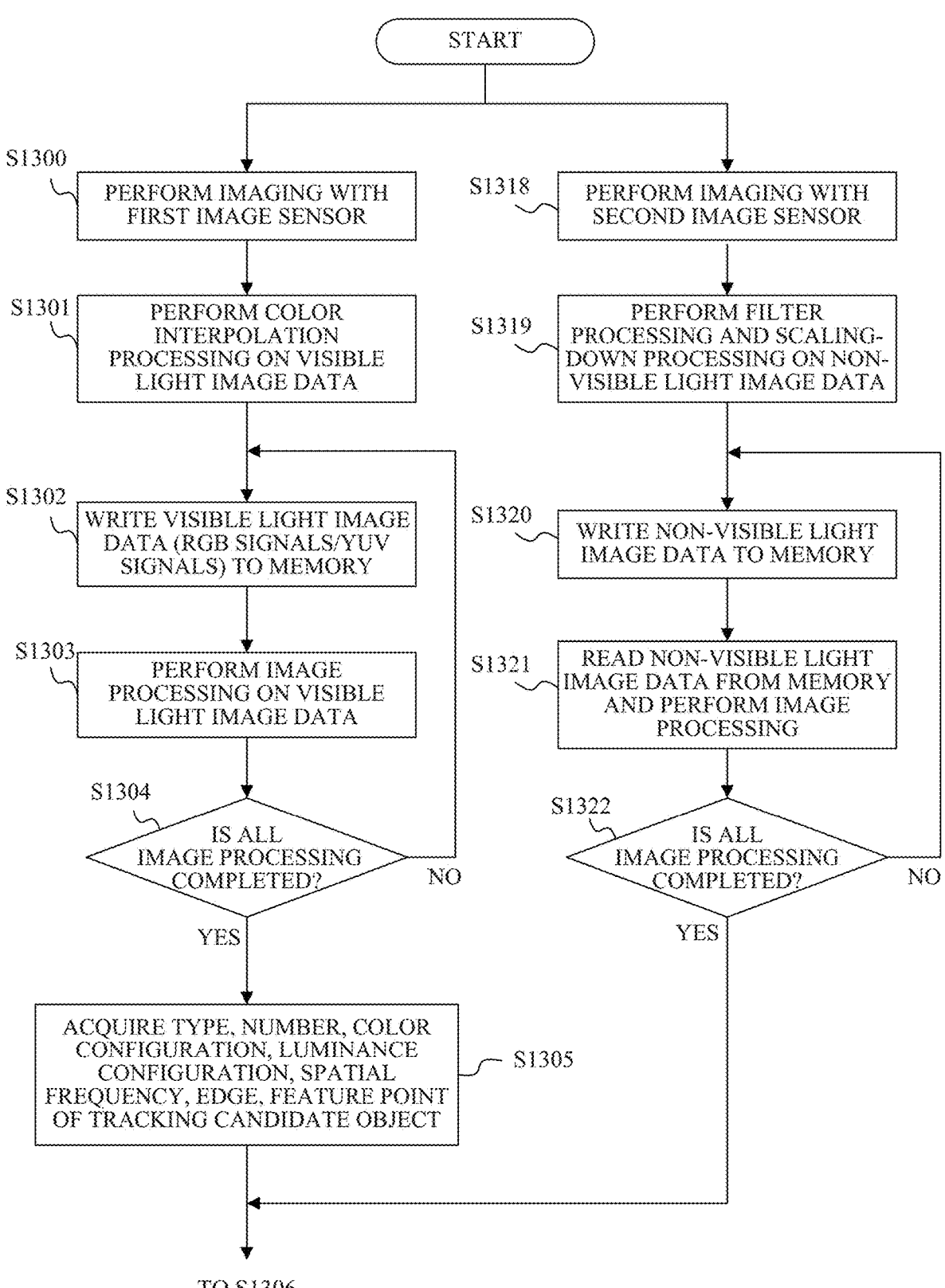
Figure 13B:
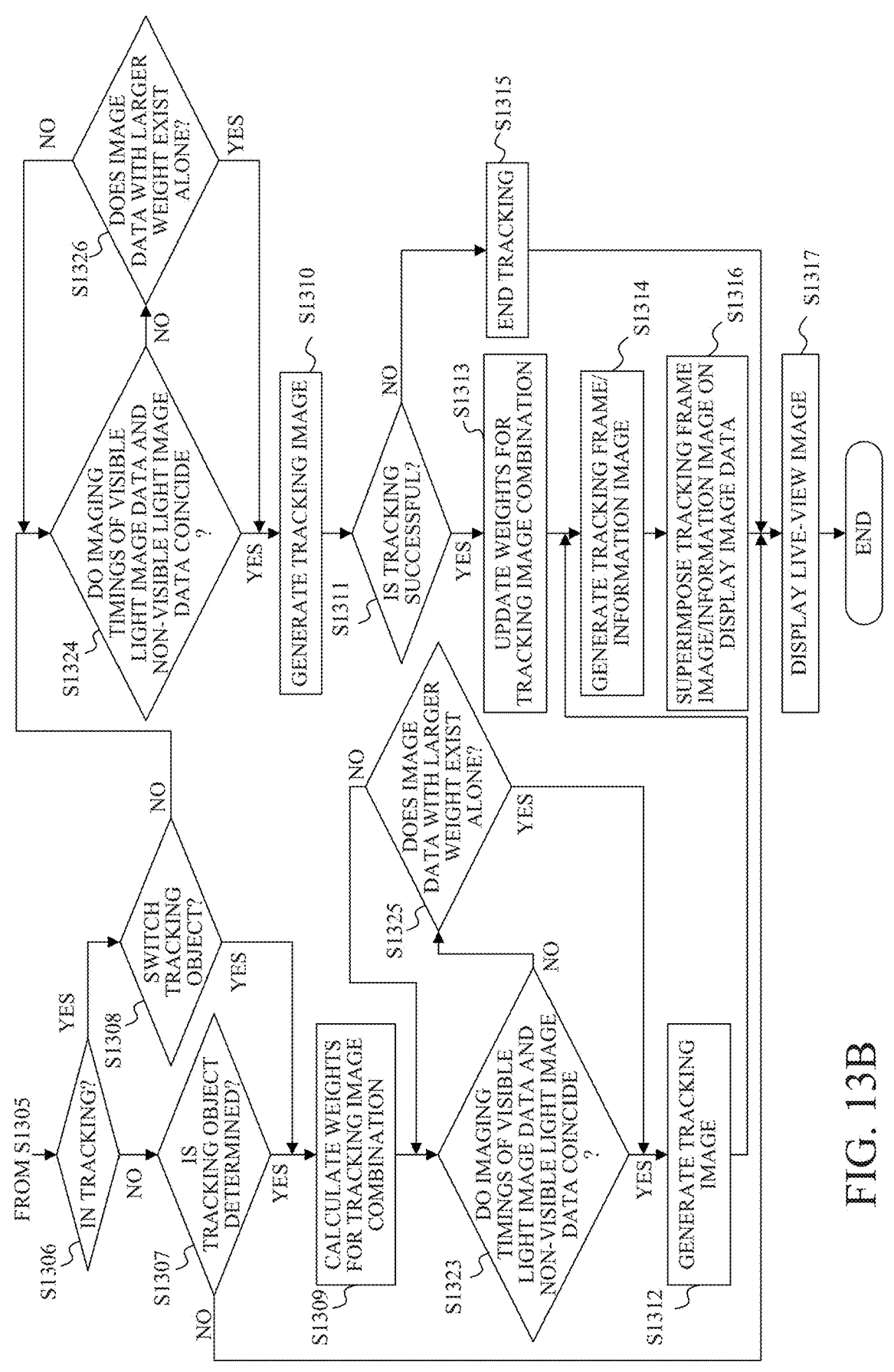

FIGS. 13A and 13B are flowcharts illustrating tracking processing executed in Example 4.

Figure 14A:
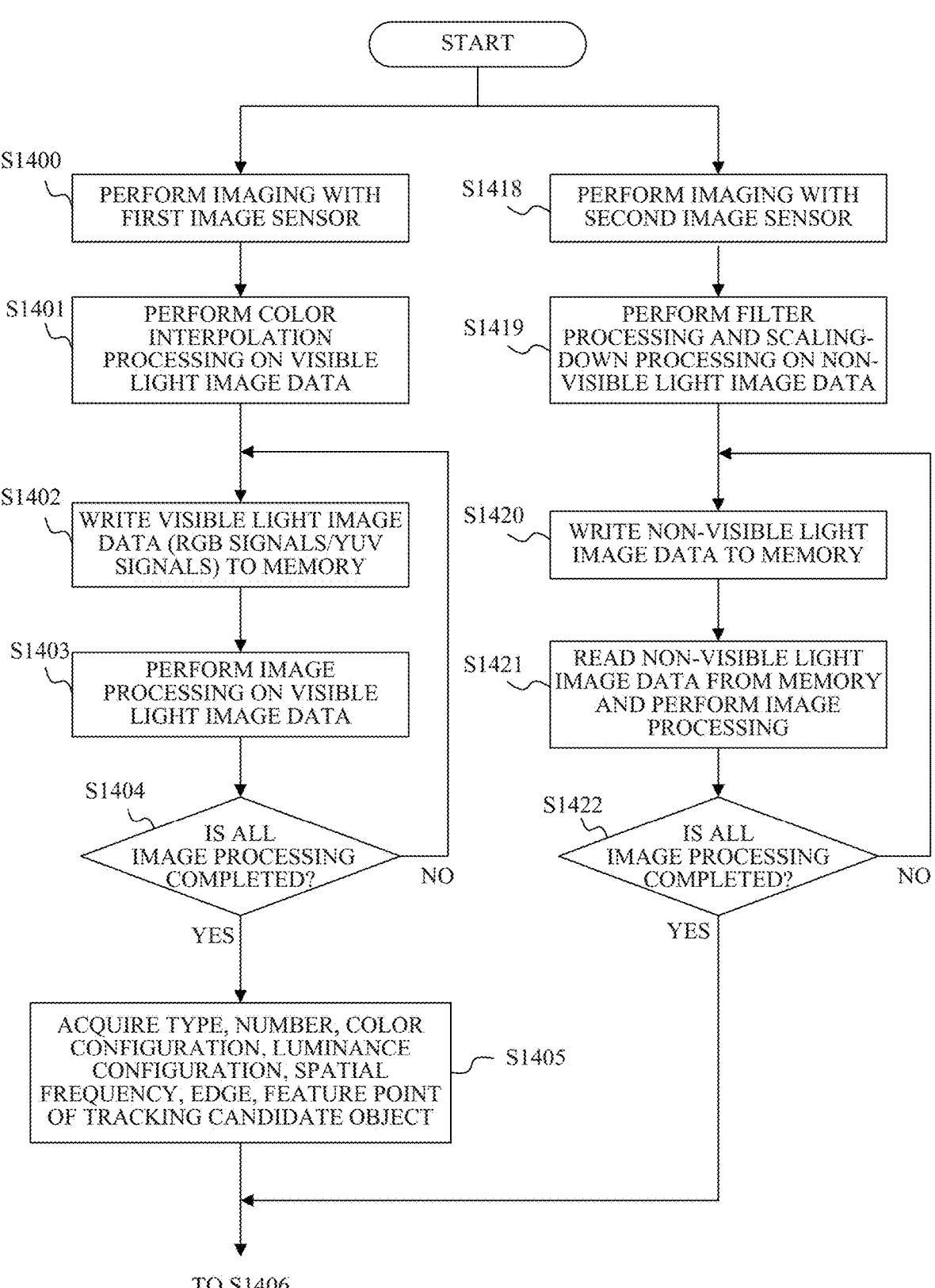
Figure 14B:
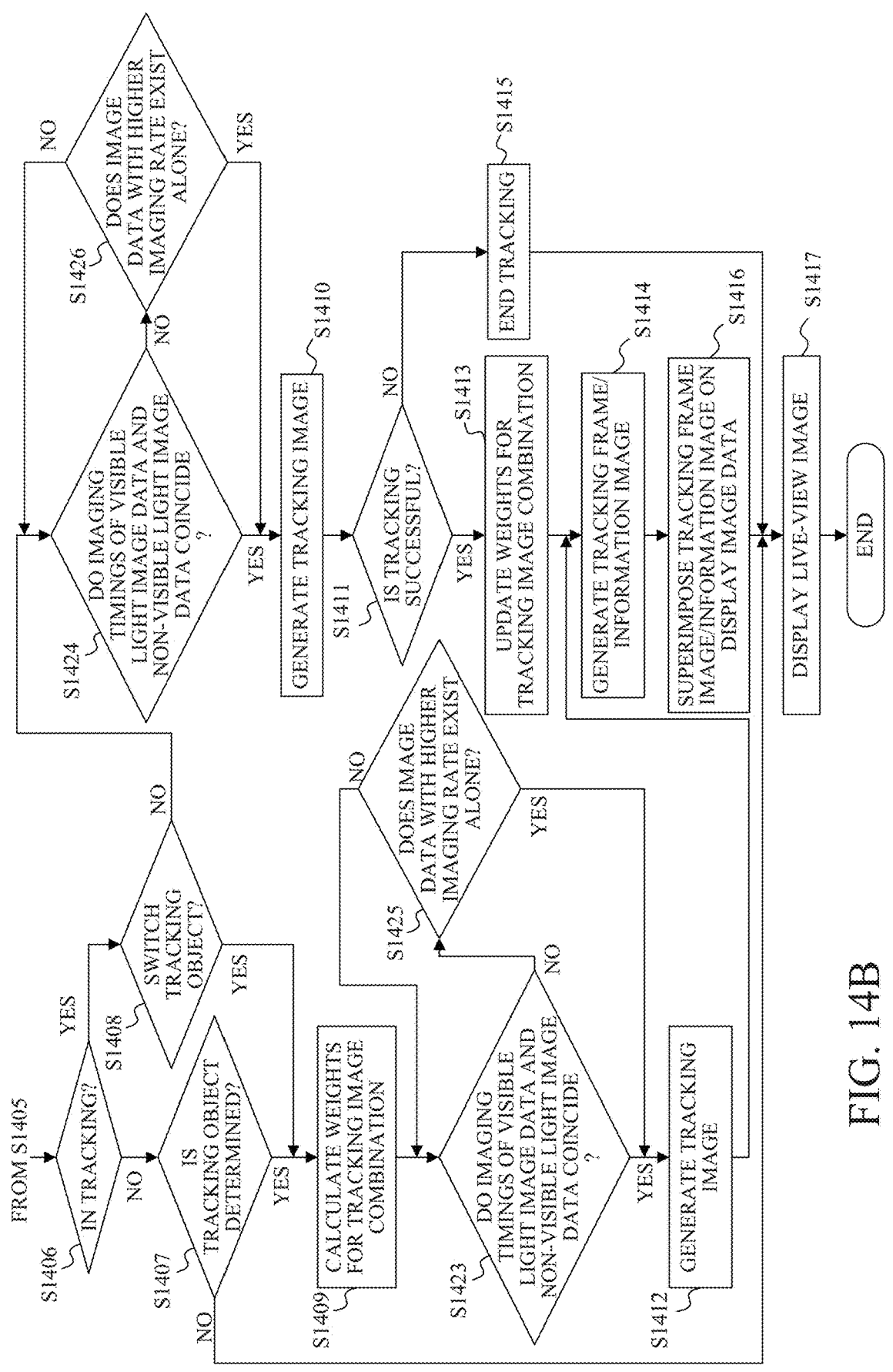

FIGS. 14A and 14B are flowcharts illustrating tracking processing executed in Example 5.

Figure 15A:
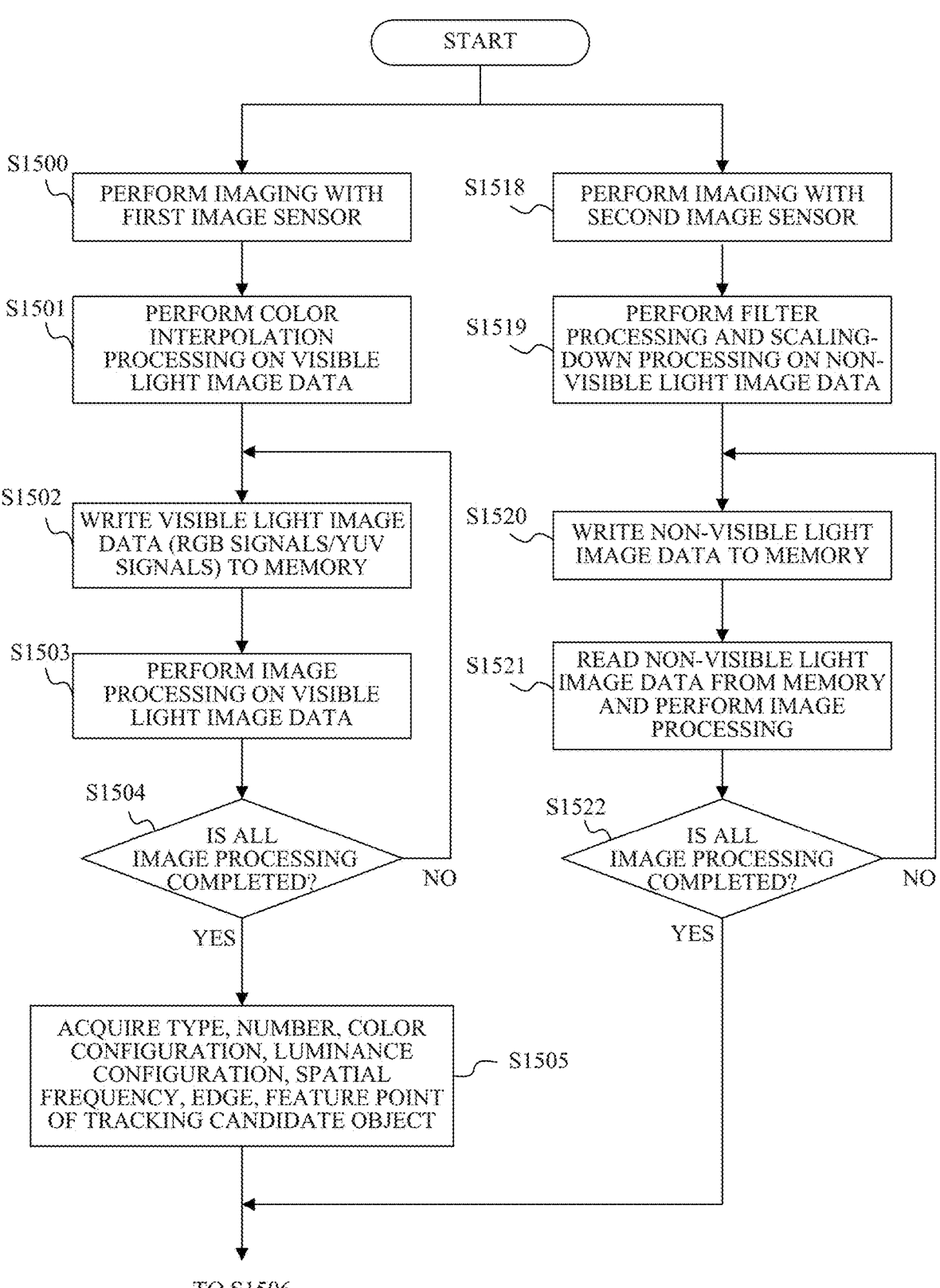
Figure 15B:
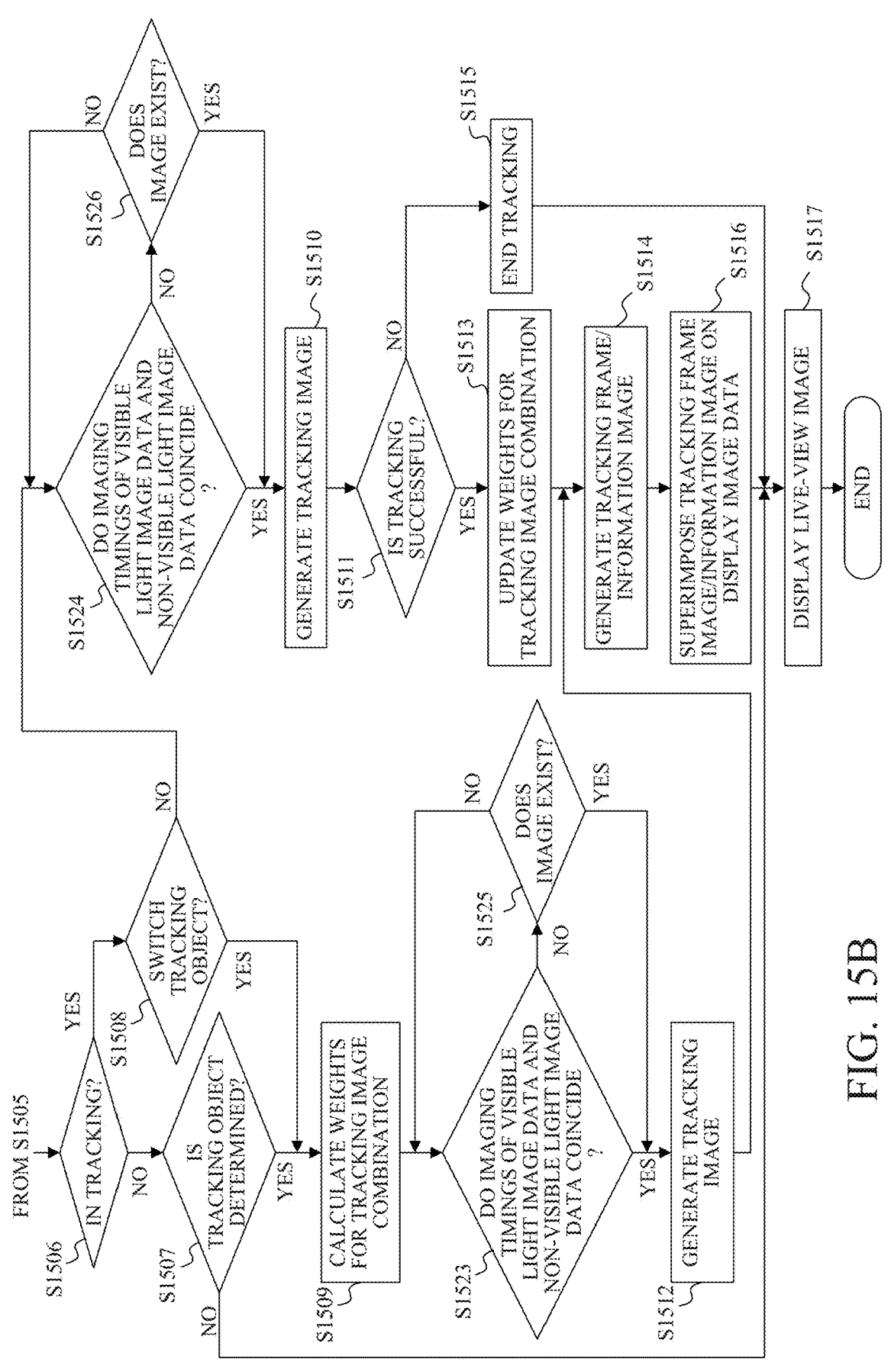

FIGS. 15A and 15B are flowcharts illustrating tracking processing executed in Example 6.

DETAILED DESCRIPTION

Examples of the present disclosure will be described below with reference to the accompanying drawings.

Example 1

Figure 1:
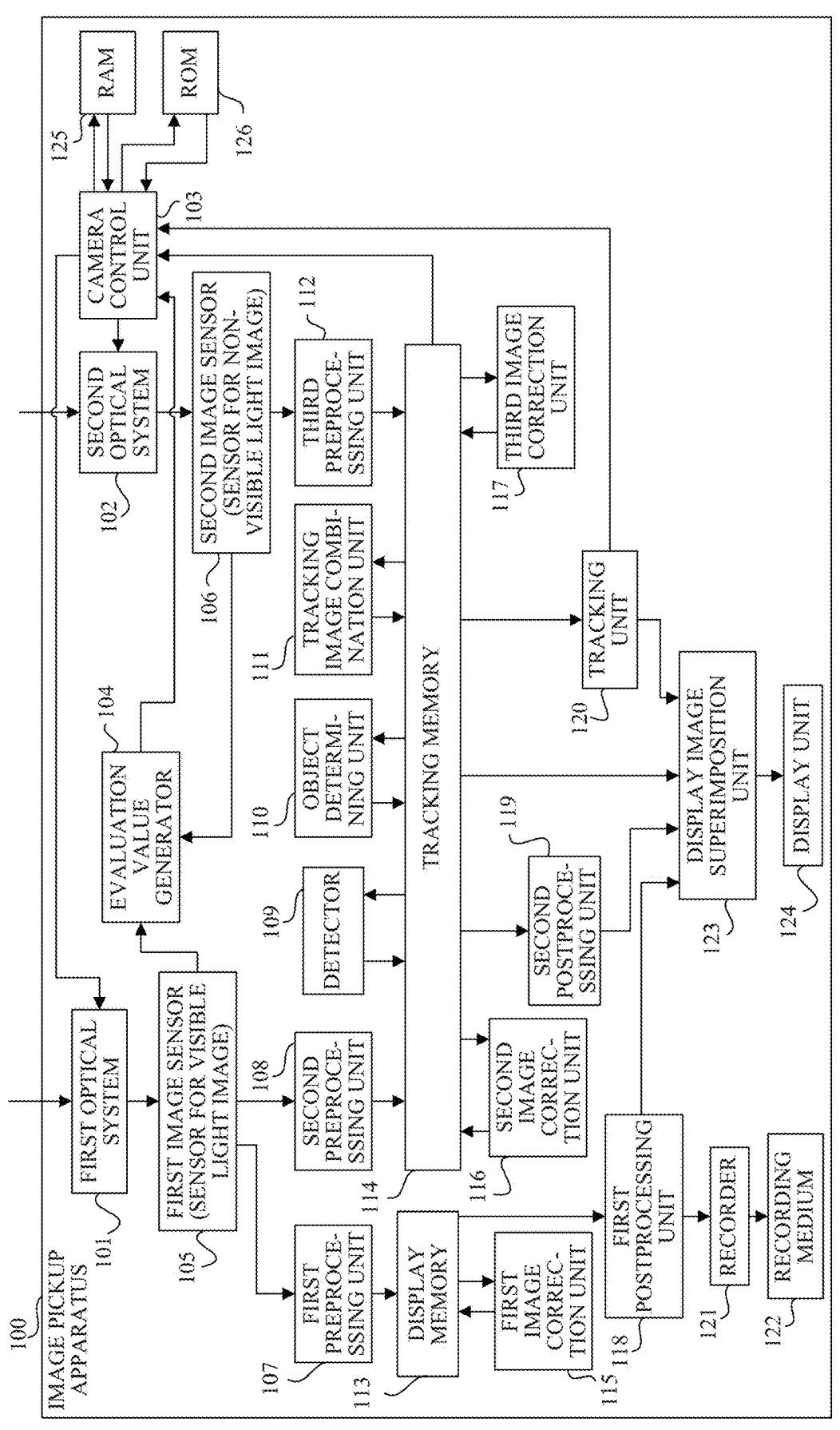
FIG. 1 is a block diagram illustrating the configuration of an image pickup apparatus of Example 1.

FIG. 1 illustrates the configuration of an image pickup apparatus 100 of Example 1. The image pickup apparatus 100 determines a tracking object to be subjected to focusing control (AF) from an image signal and specifies the position of the tracking object from image signals of subsequent frames. Then, AF control is executed based on the specified position of the tracking object, and a tracking frame indicating the position of the tracking object is superimposed and displayed on a display image generated from an image signal.

The image pickup apparatus 100 includes a first optical system 101, a second optical system 102, a camera control unit 103, an evaluation value generator 104, a first image sensor 105, a second image sensor 106, a first preprocessing unit 107, and a second preprocessing unit 108. The image pickup apparatus 100 also includes a detector (detector) 109, an object determining unit (determining unit) 110, a tracking image combination unit (combination unit) 111, a third preprocessing unit 112, a display memory 113, a tracking memory 114, a first image correction unit 115, a second image correction unit 116, and a third image correction unit 117. The image pickup apparatus 100 further includes a first postprocessing unit 118, a second postprocessing unit 119, a tracking unit (tracking unit) 120, a recorder 121, a recording medium 122, a display image superimposition unit 123, and a display unit 124. An image processing apparatus is constituted by the detector 109, the object determining unit 110, the tracking image combination unit 111, and the tracking unit 120. The object determining unit 110, the tracking image combination unit 111 and the tracking unit 120 are configured in a processor. The image processing apparatus may be constituted by, for example, a personal computer different from the image pickup apparatus. In this case, visible light and non-visible light image data generated by the first and second image sensors of the image pickup apparatus may be transmitted to the image processing apparatus through wireless or wired communication.

The first optical system 101 includes a plurality of lenses such as zoom lenses and images light from an object. The first image sensor 105 includes a plurality of pixels as photoelectric conversion elements two-dimensionally disposed on its imaging plane and generates an analog image signal by converting an object image formed through the first optical system 101 into an electric signal. The first image sensor 105 is constituted by a complementary metal oxide semiconductor (CMOS) image sensor. A color filter of a primary color Bayer array is disposed on the imaging plane of the first image sensor 105. An IR cut filter that cuts near-infrared light (wavelength of 700 to 800 nm) as near non-visible light is disposed in front of the imaging plane. Accordingly, the first image sensor 105 photoelectrically converts only visible light.

The analog image signal generated at the first image sensor 105 is converted into a digital image signal (hereinafter referred to as visible light image data) by an A/D converter included in the first image sensor 105 and is output to the evaluation value generator 104, the first preprocessing unit 107, and the second preprocessing unit 108. The A/D converter may be provided outside the first image sensor 105. The image pickup apparatus 100 generates recording image data and display image data of each frame by performing image processing to be described later on the visible light image data and records and displays these pieces of image data.

The second optical system 102 includes a plurality of lenses such as zoom lenses and images light from the object. The second image sensor 106 includes a plurality of pixels as photoelectric conversion elements two-dimensionally disposed on its imaging plane and generates an analog image signal by converting an object image formed through the second optical system 102 into an electric signal. The second image sensor 106 is constituted by a CMOS image sensor. A filter that transmits only non-visible light (near-infrared light) is disposed on the imaging plane of the second image sensor 106. Accordingly, the second image sensor 106 photoelectrically converts only non-visible light.

The analog image signal generated at the second image sensor 106 is converted into a digital image signal (hereinafter referred to as non-visible light image data) by an A/D converter included in the second image sensor 106 and is output to the evaluation value generator 104 and the third preprocessing unit 112. The A/D converter may be provided outside the second image sensor 106. An imaging unit is constituted the first image sensor 105 and the second image sensor 106. The first and second optical systems 101 and 102 may be provided at an interchangeable optical unit detachably attached to the image pickup apparatus including the first and second image sensors 105 and 106.

The evaluation value generator 104 performs generation of an AF signal, calculation of an AF evaluation value, and calculation of an automatic exposure control (AE) evaluation value by using at least one of the visible light image data from the first image sensor 105 and the non-visible light image data from the second image sensor 106. The evaluation value generator 104 outputs the AF signal and the AF and AE evaluation values thus generated to the camera control unit 103. The evaluation value generator 104 may perform generation of the AF signal and calculation of the evaluation values based on display image data generated by the first postprocessing unit 118 and non-visible light image data generated by the third image correction unit 117 to be described later.

The camera control unit 103 includes a CPU, reads, onto a RAM 126, a computer program stored in a ROM 125, and executes the computer program. The camera control unit 103 executes functions of the image pickup apparatus 100 by controlling operation of each functional block. The ROM 125 is a rewritable nonvolatile memory and stores computer programs executable by the CPU of the camera control unit 103, setting values, GUI data, and the like. The RAM 126 is a system memory used to read computer programs to be executed by the CPU of the camera control unit 103 and store necessary values during execution of computer programs. Although not illustrated in FIG. 1, the camera control unit 103 is connected to each functional block to perform communication therebetween.

The camera control unit 103 performs position control of focus lenses of the first and second optical systems 101 and 102 based on the AF signal and the AF evaluation value from the evaluation value generator 104, the result of detection by the detector 109, and the result of tracking by the tracking unit 120. In addition, the camera control unit 103 determines exposure conditions (such as exposure time, aperture value, and ISO sensitivity) based on the AE evaluation value from the evaluation value generator 104 and the above-described detection and tracking results.

The first preprocessing unit 107 performs color interpolation processing on the visible light image data from the first image sensor 105. The color interpolation processing is also called demosaic processing and is processing with which each pixel data included in the visible light image data includes the values of an R component, a G component, and a B component. The first preprocessing unit 107 may also perform scaling-down processing that reduces the number of pixels on the visible light image data as necessary. The first preprocessing unit 107 stores the processed visible light image data in the display memory 113.

The first image correction unit 115 performs correction processing such as white balance correction processing and shading correction processing, conversion processing from the RGB format to the YUV format, and the like on the visible light image data stored in the display memory 113. The first image correction unit 115 may use, for example, at least one of the visible light image data of frames temporally before and after a processing target frame in correction processing. The first image correction unit 115 outputs the processed visible light image data to the first postprocessing unit 118.

The first postprocessing unit 118 generates recording image data and display image data from the visible light image data output from the first image correction unit 115. The first postprocessing unit 118 performs, for example, encoding processing on the visible light image data and generates, as the recording image data, a data file in which the encoded visible light image data is stored. The first postprocessing unit 118 supplies the recording image data to the recorder 121.

The first postprocessing unit 118 generates display image data to be displayed on the display unit 124 from the visible light image data output from the first image correction unit 115. The display image data has a size in accordance with the display size of the display unit 124. The first postprocessing unit 118 outputs the display image data to the display image superimposition unit 123.

The recorder 121 records the recording image data generated by the first postprocessing unit 118 in the recording medium 122. The recording medium 122 is, for example, a semiconductor memory card or a built-in nonvolatile memory.

The second preprocessing unit 108 performs color interpolation processing on the visible light image data output from the first image sensor 105. The second preprocessing unit 108 stores the processed visible light image data in the tracking memory 114. The tracking memory 114 and the display memory 113 may be implemented as different address spaces in the same memory space. The second preprocessing unit 108 may also perform scaling-down processing that reduces the number of pixels on the visible light image data as necessary to reduce a processing load. The first preprocessing unit 107 and the second preprocessing unit 108 are individual functional blocks in this example but may be configured as one preprocessing unit.

The second image correction unit 116 performs correction processing such as white balance correction processing and shading correction processing, conversion processing from the RGB format to the YUV format, and the like on the visible light image data stored in the tracking memory 114. The second image correction unit 116 may also perform, on the visible light image data, image processing suitable for object detection processing. In a case where a representative luminance (for example, the average luminance of all pixels) of the visible light image data is equal to or smaller than a predetermined threshold value, the second image correction unit 116 may multiply the entire visible light image data by a constant coefficient (gain) so that the representative luminance becomes equal to or larger than the threshold value.

When performing the correction processing, the second image correction unit 116 may use the visible light image data of one or more frames different from the processing target frame among the visible light image data stored in the tracking memory 114. For example, the visible light image data of at least one of frames temporally before and after the processing target frame may be used for the correction processing. The second image correction unit 116 stores the processed visible light image data in the tracking memory 114.

The third preprocessing unit 112 performs, on the non-visible light image data from the second image sensor 106, filter processing that removes a signal component having a particular spatial frequency band and scaling-down processing that reduces the number of pixels. The third preprocessing unit 112 stores the processed non-visible light image data in the tracking memory 114.

The second optical system 102 may be integrated with the first optical system 101, the second image sensor 106 may be integrated with the first image sensor 105, and the third preprocessing unit 112 may be integrated with the second preprocessing unit 108. In a case where the second image sensor 106 is integrated with the first image sensor 105, a CMOS image sensor (for example, RGB-IR-CMOS image sensor) in which some of the plurality of pixels of the first image sensor 105 are allocated to pixels of the second image sensor 106 may be used. The first preprocessing unit 107 separates RGB image data as the visible light image data and IR image data as the non-visible light image data and stores only the RGB image data in the display memory 113 as the visible light image data. The second preprocessing unit 108 separates the RGB image data and the IR image data and stores them in the tracking memory 114 as the visible light image data and the non-visible light image data, respectively.

The third image correction unit 117 performs shading correction processing, conversion processing to the YUV format, and the like on the non-visible light image data stored in the tracking memory 114. However, the non-visible light image data has no visible light component, and thus in a case of conversion processing to the YUV format, which is a visible image format, for example, zero is allocated to UV as a color difference component and signal intensity is allocated to Y as a luminance component.

Similarly to the first image correction unit 115 and the second image correction unit 116 described above, the third image correction unit 117 may use image data of one or more frames different from the processing target frame. The non-visible light image data of at least one of frames temporally before and after the processing target frame may be used for the correction processing. The third image correction unit 117 stores the processed non-visible light image data in the tracking memory 114.

The detector 109 detects, from the visible light image data of one frame, an area (hereinafter referred to as an object candidate area) in which at least one object (object candidate for a tracking object to be described later) is included. Then, the detector 109 acquires, for each detected object candidate area, object candidate information as object information. The object candidate information includes the position and size of the object candidate in the frame, and the type (person, car/motorcycle, train, airplane, cat, dog, bird, insect, flower/fruit, branch/leaf, building, or the like) of the object candidate. The object candidate information also includes a confidence score for the type of the object candidate. In addition, the detector 109 acquires, as the object candidate information, the number of object candidate areas for each type of the object candidate.

The detector 109 may detect object candidate areas by using publicly known technologies for detecting a characteristic area such as a face area of a person or an animal. For example, the detector 109 may be configured as a class identifier subjected to machine learning using training image data as training data. There are no specific restrictions on identification (classification) algorithms. The detector 109 may be achieved by training an identifier implementing multi-class logistic regression, support vector machines, random forests, neural networks, and the like. The detector 109 stores the result of the detection in the tracking memory 114.

The detector 109 may detect object candidate areas from the non-visible light image data of one frame. For example, the luminance dispersion value of the visible light image data and the luminance dispersion value of the non-visible light image data are compared, and image data having the larger dispersion value as a result of the comparison is selected as image data suitable for detection of object candidate areas. Then, the detector 109 detects object candidate areas from the selected image data and stores the result of the detection in the tracking memory 114.

In addition to the object candidate area detection, the detector 109 may perform identification of a background area and identification of individual divided areas. In the background area identification, a scene identifier trained by using training data is separately provided, and which scene the background area belongs to is identified based on the visible light image data or the non-visible light image data. Examples of scenes include a night scene, an evening scene, a daytime scene, and other bright and dark scenes. The detector 109 stores the result of the scene identification in the tracking memory 114.

The identification of individual divided areas can be achieved by an area scene identifier trained by using training data. The detector 109 identifies the type of each of a plurality of divided areas based on the visible light image data or the non-visible light image data. For example, grass/plant, blue sky, cloud, ground, and road are identified. The detector 109 stores the result of the identification of individual divided areas in the tracking memory 114.

The object determining unit 110 determines a tracking object, which is an AF target of the camera control unit 103 and a tracking target of the tracking unit 120, based on the type of each object candidate area detected by the detector 109, the number of object candidate areas of the same type, and the position, size, and confidence score of each object candidate area. In a frame in which the tracking unit 120 tracks the tracking object, the same image data is input to the detector 109 and the tracking unit 120.

The tracking object is a main object. Examples of methods of determining the tracking object from one or more object candidate areas include a method of determining the tracking object based on optional priority ranking prepared in advance. The priority ranking may be determined in advance at the object determining unit 110 or may be set through an operation on the image pickup apparatus 100 by a user. In the priority ranking, for example, a largest person in size is prioritized most, or an object nearest to an AF area designated by the user is prioritized most. The object determining unit 110 stores, in the tracking memory 114, information specifying which object candidate area is to be tracked.

The tracking image combination unit 111 reads the type of the tracking object and information (hereinafter referred to as tracking object area information) of an object candidate area in which the tracking object is included, which are stored in the tracking memory 114. The type of the tracking object and the tracking object area information is the object information acquired through the detector 109. The tracking object area information includes, for example, color configuration, luminance dispersion value, spatial frequency, the position of any edge with an edge intensity equal to or larger than a constant value, and the position of any feature point with an intensity equal to or larger than a constant value in the area. The tracking image combination unit 111 also reads the type of the background area, the type of any surrounding area of the tracking object, and the type of any object candidate existing around the tracking object. Then, the tracking image combination unit 111 calculates optimal values of a visible light side weight value and a non-visible light side weight value as the combination ratio of visible image data and non-visible image data for generating combined image data to be used for object tracking processing by the tracking unit 120. The tracking image combination unit 111 generates tracking image data as combined image data by combining the visible image data and the non-visible image data stored in the tracking memory 114 based on the calculated visible light side and non-visible light side weight values. The tracking image combination unit 111 stores the visible light side weight value, the non-visible light side weight value, and the combined image data in the tracking memory 114.

Without combining the visible image data and the non-visible image data, the tracking image combination unit 111 may select either image data as the tracking image data based on the calculated visible light side and non-visible light side weight values and store the selected image data in the tracking memory 114.

The calculation of the visible light side weight value and the non-visible light side weight value by the tracking image combination unit 111 will be described below with weight contribution values for each type of the tracking object, which are illustrated in FIG. 6, as an example. The detector 109 detects "person (bright clothing)", "person (dark clothing)", "animal (bright fur)", or "animal (dark fur)" as the type of an object candidate area. In this case, the detector 109 is trained as an identifier by executing training with training data in which person clothing or animal fur is associated with information of whether the clothing is bright clothing or dark clothing or whether the fur is bright fur or dark fur.

The tracking image combination unit 111 sets the visible light side weight value of 50, the non-visible light side weight value of 50, and the summed value of 100 as basis weight values of combination. For example, in a case where the type of the tracking object is "person (bright clothing)", the visible light side weight contribution value of 10 and the non-visible light side weight contribution value of 0 are employed based on the corresponding type ID 601, and the visible light side weight contribution value of 10 is added to the visible light side weight value of 50 to set the visible light side weight value of 60. In addition, the non-visible light side weight contribution value of 0 is added to the non-visible light side weight value of 50 to set the non-visible light side weight value of 50, thereby setting the summed value of 110. As indicated in an equation below, the tracking image combination unit 111 multiplies the non-visible light image data and the visible light image data of each pixel by values obtained by dividing the respective weight values by the summed value and adds the multiplied values, thereby generating the combined image data.

$$\text{Combined image data} = \text{visible light image data} \times (60/110) + \text{non-visible light image data} \times (50/110)$$

The generation of the combined image data with the above-described expression increases the ratio of the visible light image data in the combined image data in a case where the type of the tracking object is "person (bright clothing)". Accordingly, tracking processing prioritizing the visible light image data can be achieved at the tracking unit 120.

In a case where the type of the tracking object is "person (dark clothing)", the tracking image combination unit 111 employs the visible light side weight contribution value of 0 and the non-visible light side weight contribution value of 10 based on a type ID 602 and generates the combined image data. Accordingly, the ratio of the non-visible light image data in the combined image data is increased and tracking processing prioritizing the non-visible light image data can be achieved at the tracking unit 120.

In a case where the type of the tracking object is "car/motorcycle", the tracking image combination unit 111 employs the visible light side weight contribution value of 0 and the non-visible light side weight contribution value of 20 based on a type ID 603. In a case where the type of the tracking object is "train", the visible light side weight contribution value of 0 and the non-visible light side weight contribution value of 20 are employed based on a type ID 604. In a case where the type of the tracking object is "airplane", the visible light side weight contribution value of 0 and the non-visible light side weight contribution value of 20 are employed based on a type ID 605. In a case where the type of the tracking object is "animal (bright fur)", the visible light side weight contribution value of 10 and the non-visible light side weight contribution value of 0 are employed based on a type ID 606. In a case where the type of the tracking object is "animal (dark fur)", the visible light side weight contribution value of 0 and the non-visible light side weight contribution value of 10 are employed based on a type ID 607. In a case where the type of the tracking object is "butterfly", the visible light side weight contribution value of 0 and the non-visible light side weight contribution value of 10 are employed based on a type ID 608. In a case where the type of the tracking object is "flower/fruit", the visible light side weight contribution value of 10 and the non-visible light side weight contribution value of 0 are employed based on a type ID 609. In a case where the type of the tracking object is "building", the visible light side weight contribution value of 0 and the non-visible light side weight contribution value of 20 are employed based on a type ID 610. Then, the combined image data is generated by using these weight contribution values.

The tracking image combination unit 111 may compare the visible light side weight value and the non-visible light side weight value after update based on the type of the tracking object. The visible light image data is selected as the tracking image data (combined image data) in a case where the visible light side weight value is equal to or larger than the non-visible light side weight value, or the non-visible light image data is selected as the tracking image data in a case where the visible light side weight value is smaller than the non-visible light side weight value. Accordingly, only one of the visible light image data and the non-visible light image data may be used for tracking processing at the tracking unit 120.

In this manner, optimum image data for tracking processing at the tracking unit 120 can be prepared by adjusting, based on the type of the tracking object, the weight value of the visible light image data and the weight value of the non-visible light image data in combined image data generation at the tracking image combination unit 111. The weight contribution values illustrated in FIG. 6 and the generation expression of the combined image data are merely exemplary, and other weight contribution values and generation expressions may be used.

Subsequently, weight contribution values added after calculation of the visible light side weight value and the non-visible light side weight value based on the weight contribution values for each type of the tracking object, which are illustrated in FIG. 6 will be described below with weight contribution values of the background area and the surrounding area of the tracking object, which are illustrated in FIG. 7, as an example.

As described above, the detector 109 includes an identifier configured to identify which scene the background area belongs to. The tracking image combination unit 111 adds a visible light side weight contribution value and a non-visible light side weight contribution value of each type ID and each background area ID to the visible light side weight value of 50 and the non-visible light side weight value of 50 as basis weight values of combination. In a case where the type of the tracking object is "person (bright clothing)" and the background area is "night scene", the visible light side weight contribution value of 10 and the non-visible light side weight contribution value of 0 are employed based on the type ID 601, and the visible light side weight contribution value of 0 and the non-visible light side weight contribution value of 30 are employed based on a background area ID 701. Then, the visible light side weight contribution value of 10 is added to the visible light side weight value of 50 to set the visible light side weight value of 60, and the non-visible light side weight contribution value of 30 is added to the non-visible light side weight value of 50 to set the non-visible light side weight value of 80, thereby setting the summed value of 140. As indicated in an equation below, the tracking image combination unit 111 multiplies the non-visible light image data and the visible light image data of each pixel by values obtained by dividing the respective weight values by the summed value and adds the multiplied values to generate the combined image data.

$$\text{Combined image data} = \text{visible light image data} \times (60/140) +$$
$$\text{non-visible light image data} \times (80/140)$$

The generation of the combined image data with the above-described expression increases the ratio of the non-visible light image data in the combined image data in a case where the type of the tracking object is "person (bright clothing)" and the background area is "night scene". Accordingly, tracking processing prioritizing the non-visible light image data can be achieved at the tracking unit 120.

In a case where the background area is "daytime scene", the tracking image combination unit 111 employs the visible light side weight contribution value of 30 and the non-visible light side weight contribution value of 0 based on a background area ID 703 and generates the combined image data. Accordingly, the ratio of the visible light image data in the combined image data is increased and tracking processing prioritizing the visible light image data can be achieved at the tracking unit 120.

In a case where the background area is "evening scene", the tracking image combination unit 111 employs the visible light side weight contribution value of 0 and the non-visible light side weight contribution value of 10 based on a background area ID 702. In a case where the background area is "other (bright)", the visible light side weight contribution value of 10 and the non-visible light side weight contribution value of 0 are employed based on a background area ID 704. In a case where the background area is "other (dark)", the visible light side weight contribution value of 0 and the non-visible light side weight contribution value of 10 are employed based on a background area ID 705. Then, the combined image data is generated by using these weight contribution values.

As described above, the detector 109 includes an identifier configured to identify which scene each divided area of an image belongs to. The tracking image combination unit 111 adds a visible light side weight contribution value and a non-visible light side weight contribution value of each type ID, each background area ID, and each surrounding area ID to the visible light side weight value of 50 and the non-visible light side weight value of 50 as basis weight values of combination. In a case where the type of the tracking object is "person (bright clothing)", the background area is "night scene", and the surrounding area of the tracking object is "grass/plant", the tracking image combination unit 111 employs the visible light side weight contribution value of 10 and the non-visible light side weight contribution value of 0 based on the type ID 601. In addition, the visible light side weight contribution value of 0 and the non-visible light side weight contribution value of 30 are employed based on the background area ID 701, and the visible light side weight contribution value of 20 and the non-visible light side weight contribution value of 0 are employed based on a surrounding area ID 706. Then, the visible light side weight contribution value of 30 is added to the visible light side weight value of 50 to set the visible light side weight value of 80, and the non-visible light side weight contribution value of 30 is added to the non-visible light side weight value of 50 to set the non-visible light side weight value of 80, thereby setting the summed value of 160. As indicated in an equation below, the tracking image combination unit 111 multiplies the non-visible light image data and the visible light image data of each pixel by values obtained by dividing the respective weight values by the summed value and adds the multiplied values to generate the combined image data.

$$\text{Combined image data} = \text{visible light image data} \times (80/160) +$$
$$\text{non-visible light image data} \times (80/160)$$

The generation of the combined image data with the above-described expression equalizes the ratios of the visible light image data and the non-visible light image data in the combined image data in a case where the type of the tracking object is "person (bright clothing)", the background area is "night scene", and the surrounding area of the tracking object is "grass/plant". Accordingly, tracking processing treating the visible light image data and the non-visible light image data as equal values can be achieved at the tracking unit 120.

In a case where the surrounding area of the tracking object is "ground", the tracking image combination unit 111 employs the visible light side weight contribution value of 0 and the non-visible light side weight contribution value of 10 based on a surrounding area ID 709 and generates the combined image data. Accordingly, the ratio of the non-visible light image data in the combined image data is increased and tracking processing prioritizing the non-visible light image data can be achieved at the tracking unit 120. In a case where the surrounding area of the tracking object is "blue sky", the visible light side weight contribution value of 0 and the non-visible light side weight contribution value of 20 are employed based on a surrounding area ID 707. In a case where the surrounding area of the tracking object is "cloud", the visible light side weight contribution value of 10 and the non-visible light side weight contribution value of 0 are employed based on a surrounding area ID 708. In a case where the surrounding area of the tracking object is "road", the visible light side weight contribution value of 0 and the non-visible light side weight contribution value of 10 are employed based on a background area ID 710. Then, the combined image data is generated by using these weight contribution values.

How the tracking image combination unit 111 determines surrounding areas of the tracking object will be described below with reference to FIG. 11. Each quadrilateral area in visible light image data 1100 illustrated in FIG. 11 is a divided area, and hatched areas located outside and separated by one intervening area from an area including a tracking object 1101 are considered surrounding areas of the tracking object. The tracking image combination unit 111 determines a most frequent area identification result from the result of area identification by the detector 109 across these 12 surrounding areas and employs the most frequent area identification result as the result of surrounding area detection. In a case where there are a plurality of most frequent area identification results, the result of surrounding area detection is determined based on optional priority ranking that is set in advance. Priority is set to be high in ascending order of surrounding area ID, and the tracking image combination unit 111 determines the surrounding areas as "grass/plant" in a case where three of the 12 surrounding areas are "grass/plant" and another three are "blue sky".

In a case where the type of the tracking object is "person (bright clothing)", the background area is "night scene", an object candidate (surrounding object) different from the tracking object exists in a surrounding area within a range at a constant distance from the tracking object, and the type of the surrounding object is "branch/leaf", the tracking image combination unit 111 employs contribution values as follows. The visible light side weight contribution value of 10 and the non-visible light side weight contribution value of 0 are employed based on the type ID 601, and the visible light side weight contribution value of 0 and the non-visible light side weight contribution value of 30 are employed based on the background area ID 701. In addition, the visible light side weight contribution value of 20 and the non-visible light side weight contribution value of 0 are employed based on a surrounding object type ID 711. Then, the tracking image combination unit 111 adds the visible light side and non-visible light side weight contribution values of the type ID, the background area ID, and the surrounding object type ID to the visible light side weight value of 50 and the non-visible light side weight value of 50 as basis weight values of combination. Specifically, the visible light side weight contribution value of 30 is added to the visible light side weight value of 50 to set the visible light side weight value of 80, the non-visible light side weight contribution value of 30 is added to the non-visible light side weight value of 50 to set the non-visible light side weight value of 80, thereby setting the summed value of 160. As indicated in an equation below, the tracking image combination unit 111 multiplies the non-visible light image data and the visible light image data of each pixel by values obtained by dividing the respective weight values by the summed value and adds the multiplied values to generate the combined image data.

$$\text{Combined image data} = \text{visible light image data} \times (80/160) +$$
$$\text{non-visible light image data} \times (80/160)$$

The generation of the combined image data with the above-described expression equalizes the ratios of the visible light image data and the non-visible light image data in the combined image data in a case where the type of the tracking object is "person (bright clothing)", the background area is "night scene", and a surrounding object of the type "branch/leaf" exists in a surrounding area of the tracking object. Accordingly, tracking processing treating the visible light image data and the non-visible light image data as equal values can be achieved at the tracking unit 120.

The following describes a case where weight contribution values for any of the type of the background area, the type of a surrounding area of the tracking object, and the type of a surrounding object, which are illustrated in FIG. 7 are added to weight contribution values for each type of the tracking object, which are illustrated in FIG. 6, and weight contribution values of tracking object information illustrated in FIG. 8 are further added.

In a case where the type of the tracking object is "person (bright clothing)", the background area is "night scene", and the color dispersion of the tracking object area is equal to or larger than a predetermined threshold value, the tracking image combination unit 111 employs weight contribution values as follows. The visible light side weight contribution value of 10 and the non-visible light side weight contribution value of 0 are employed based on the type ID 601, and the visible light side weight contribution value of 0 and the non-visible light side weight contribution value of 30 are employed based on the background area ID 701. In addition, the visible light side weight contribution value of 20 and the non-visible light side weight contribution value of 0 are employed based on a tracking object information ID 801. Then, the tracking image combination unit 111 adds the visible light side and non-visible light side weight contribution values of the type ID, the background area ID, and the tracking object information ID to the visible light side weight value of 50 and the non-visible light side weight value of 50 as basis weight values of combination. Specifically, the visible light side weight contribution value of 30 is added to the visible light side weight value of 50 to set the visible light side weight value of 80, the non-visible light side weight contribution value of 30 is added to the non-visible light side weight value of 50 to set the non-visible light side weight value of 80 and the summed value of 160. As indicated in an equation below, the tracking image combination unit 111 multiplies the non-visible light image data and the visible light image data of each pixel by values obtained by dividing the respective weight values by the summed value and adds the multiplied values to generate the combined image data.

$$\text{Combined image data} = \text{visible light image data} \times (80/160) +$$
$$\text{non-visible light image data} \times (80/160)$$

The generation of the combined image data with the above-described expression equalizes the ratios of the visible light image data and the non-visible light image data in the combined image data in a case where the type of the tracking object is "person (bright clothing)", the background area is "night scene", and the color dispersion of the tracking object area is equal to or larger than the threshold value. Accordingly, tracking processing treating the visible light image data and the non-visible light image data as equal values can be achieved at the tracking unit 120.

In a case where the color dispersion of the tracking object area is smaller than the threshold value, the tracking image combination unit 111 employs the visible light side weight contribution value of 0 and the non-visible light side weight contribution value of 10 based on a tracking object information ID 802 and generates the combined image data. Accordingly, the ratio of the non-visible light image data in the combined image data is increased and tracking processing prioritizing the non-visible light image data can be achieved at the tracking unit 120.

In a case where the luminance dispersion of the tracking object area is equal to or larger than a predetermined threshold value, the tracking image combination unit 111 employs the visible light side weight contribution value of 10 and the non-visible light side weight contribution value of 0 based on a tracking object information ID 803. In a case where the luminance dispersion of the tracking object area is smaller than the threshold value, the visible light side weight contribution value of 0 and the non-visible light side weight contribution value of 10 are employed based on a tracking object information ID 804. In a case where the amplitude average at a spatial frequency equal to or higher than a predetermined frequency in the tracking object area is equal to or larger than a predetermined threshold value, the visible light side weight contribution value of 10 and the non-visible light side weight contribution value of 0 are employed based on a tracking object information ID 805. In a case where the amplitude average at the above-described spatial frequency in the tracking object area is smaller than the threshold value, the visible light side weight contribution value of 0 and the non-visible light side weight contribution value of 10 are employed based on a tracking object information ID 806. In a case where the number of edge pixels with edge intensity equal to or higher than a predetermined edge intensity in the tracking object area is equal to or larger than a predetermined threshold value, the visible light side weight contribution value of 20 and the non-visible light side weight contribution value of 0 are employed based on a tracking object information ID 807. In a case where the above-described number of edge pixels in the tracking object area is smaller than the threshold value, the visible light side weight contribution value of 0 and the non-visible light side weight contribution value of 10 are employed based on a tracking object information ID 808. In a case where the number of feature points with intensity equal to or higher than a predetermined intensity in the tracking object area is equal to or larger than a predetermined threshold value, the visible light side weight contribution value of 20 and the non-visible light side weight contribution value of 0 are employed based on a tracking object information ID 809. In a case where the above-described number of feature points in the tracking object area is smaller than the threshold value, the visible light side weight contribution value of 0 and the non-visible light side weight contribution value of 10 are employed based on a tracking object information ID 810. Then, the combined image data is generated by using these weight contribution values.

The tracking unit 120 estimates a tracking target object area from the combined image data of the processing target frame (current frame) stored in the tracking memory 114 and outputs the position and size of the estimated object area in the frame as a tracking result. In this case, the tracking unit 120 estimates the tracking target object area of the current frame by using, for example, the combined image data of the current frame and the combined image data of a past frame (for example, the previous frame) acquired by imaging before the current frame. The tracking unit 120 outputs the tracking result to the display image superimposition unit 123 and the camera control unit 103.

The tracking unit 120 estimates an area in the processing target frame, which corresponds to the tracking target object area in the past frame. Thus, the tracking target object area determined for the processing target frame by the object determining unit 110 is not the tracking target object area in tracking processing for the processing target frame. The tracking target object area in tracking processing for the processing target frame is the tracking target object area in the past frame. The tracking target object area determined for the processing target frame by the object determining unit 110 is used for tracking processing for the next frame when the tracking target object is switched to another object.

The tracking unit 120 may estimate the tracking target object area by similarity correlation using information (color information) of the color configuration of the tracking target object area. In this case, the color information of the tracking target object area is updated with the tracking target object area in the past frame, and tracking processing for the next frame is executed. Alternatively, the tracking unit 120 may use pattern matching with the tracking target object area in the past frame as a template. In this case, the template of pattern matching may be updated, for each frame, with the tracking target object area determined by the object determining unit 110. Moreover, the tracking unit 120 may estimate the position and size of the tracking target object area in the current frame by using a multi-layer neural network including a trained convolutional layer.

The detector 109 and the tracking unit 120 may be integrated. With this integration, circuits of the detector 109 and the tracking unit 120 are consolidated into one unit, and thus reduction in circuit size and electric power consumption is possible. However, in a case where the detector 109 and the tracking unit 120 are integrated, image data input to the detector 109 is the combined image data generated by the tracking image combination unit 111. Accordingly, detection performance of the detector 109 is affected by the visible light side and non-visible light side weight values calculated by the tracking image combination unit 111 based on results of detection by the detector 109 in one or more previous frames and the tracking object determined by the object determining unit 110.

The type of the tracking object is sometimes not the same as the type of a priority object that is highest in the above-described priority ranking. For example, the tracking object is determined with no largest priority object in past frames, but then a priority object enters the frame. In this case, when the non-visible light image data is prioritized in the combined image data, the detector 109 can easily detect an object by using the visible light image data in one frame, depending on the type of the priority object. Then, in calculation of the visible light side and non-visible light side weight values at the tracking image combination unit 111, weight contribution values in accordance with the type of the priority object may be employed instead of weight contribution values in accordance with the type of the tracking object. Accordingly, the tracking image combination unit 111 can generate the combined image data with which the detector 109 can easily detect the priority object.

The display image superimposition unit 123 as a display controller generates an image of the tracking frame based on the size of the tracking object area. The tracking frame image is, for example, an image of a frame with a quadrilateral outline circumscribing the tracking object area. The display image superimposition unit 123 generates image data in which the tracking frame image is superimposed on the display image data output from the first postprocessing unit 118 such that the tracking frame is displayed at the position of the object area included in the tracking result. The display image superimposition unit 123 may generate an information image indicating the current setting values, state, and the like of the image pickup apparatus 100 and may superimpose the information image on the display image data output from the first postprocessing unit 118 such that the information image is displayed at a predetermined position. The display image superimposition unit 123 outputs the superimposed display image data to the display unit 124.

The display unit 124 is, for example, a liquid crystal display or an organic EL display. The display unit 124 displays an image based on the display image data output from the display image superimposition unit 123.

Operation of functional blocks related to object tracking functions, such as the tracking image combination unit 111 and the tracking unit 120 may be stopped in a case where the object tracking functions are not executed.

A flowchart in FIG. 2 illustrates processing of displaying the visible light image data. The camera control unit 103 as a computer executes the present processing in accordance with a computer program.

At step S200, the camera control unit 103 causes the first image sensor 105 to photoelectrically convert (image) an object image formed through the first optical system 101, thereby generating the visible light image data.

At step S201, the camera control unit 103 causes the first preprocessing unit 107 to perform color interpolation processing on the visible light image data.

At step S202, the camera control unit 103 causes the first preprocessing unit 107 to write, to the display memory 113, the visible light image data subjected to the color interpolation processing.

At step S203, the camera control unit 103 causes the evaluation value generator 104 to calculate AF and AE evaluation values from the visible light image data. The camera control unit 103 also causes the first image correction unit 115 to perform image processing such as correction processing and conversion processing described above on the visible light image data stored in the display memory 113. In this case, the number of reading lines from the display memory 113 is different depending on image processing performed at the first image correction unit 115. Specifically, RGB signals of one line or a plurality of lines are read for image processing on each line, or image data is divided into a plurality of areas and RGB signals are read for each area.

At step S204, the camera control unit 103 determines whether all necessary image processing is completed. In a case where not all image processing is completed, the camera control unit 103 returns to step S202 and writes, to the display memory 113, the visible light image data subjected to the image processing at the first image correction unit 115 instead of the first preprocessing unit 107. In a case where all image processing is completed, the camera control unit 103 proceeds to step S205.

At step S205, the camera control unit 103 causes the first postprocessing unit 118 to convert the visible light image data (RGB signals or YUV signals) subjected to the image processing from the first image correction unit 115 into display image data and output the display image data to the display image superimposition unit 123.

At step S206, the camera control unit 103 causes the display image superimposition unit 123 to determine whether there is a tracking frame image or an information image to be superimposed on the display image data from the first postprocessing unit 118. The camera control unit 103 proceeds to step S207 in a case where there is a tracking frame image or an information image to be superimposed, or causes the display image superimposition unit 123 to output the display image data to the display unit 124 otherwise.

At step S207, the camera control unit 103 causes the display image superimposition unit 123 to perform image superimposition processing on the display image data and output the display image data subjected to the image superimposition processing to the display unit 124.

At step S208, the camera control unit 103 causes the display unit 124 to display the display image data from the display image superimposition unit 123. The above-described processing at steps S200 to S208 is repeated for each frame to display a live-view image as a visible light image on the display unit 124.

Flowcharts in FIGS. 3A and 3B illustrate processing (image processing method) executed by the camera control unit 103 in accordance with a computer program to determine and track an AF target object and display a tracking frame.

Processing at steps S300 to S304 is the same as the processing at steps S200 to S204 in FIG. 2. However, a memory in which the visible light image data is stored at step S302 is not the display memory 113 but the tracking memory 114. In addition, image processing at step S303 is not image processing for display but image processing for object detection.

At step S305, the camera control unit 103 causes the detector 109 to detect information of one or more object candidate areas from the visible light image data of the current frame on which all necessary image processing is completed. This object candidate area information includes the position, size, and type of each object candidate area, the number of object candidate areas of the same type, and confidence scores. Then, the camera control unit 103 causes the detector 109 to write the detection result to the tracking memory 114.

At step S306, the camera control unit 103 determines whether the tracking unit 120 is in a tracking state of executing tracking processing by using the visible light image data of the current frame since the object determining unit 110 has already determined the tracking object in the past frame. The camera control unit 103 proceeds to step S308 in the case of the tracking state or proceeds to step S307 otherwise.

At step S307, the camera control unit 103 causes the object determining unit 110 to read, from the tracking memory 114, the object candidate area information detected by the detector 109 and execute tracking object determination processing based on the object candidate area information and a priority ranking setting determined in advance. Through the tracking object determination processing, one tracking object is determined as an AF target. In a case where no object candidate area exists and no tracking object is determined, the camera control unit 103 proceeds to processing at step S317 without executing tracking processing. In a case where one tracking object is determined, the camera control unit 103 causes the object determining unit 110 to store information specifying the tracking object in the tracking memory 114 and then proceeds to step S309.

At step S309, the camera control unit 103 causes the tracking image combination unit 111 to read the tracking object information from the tracking memory 114. Then, the camera control unit 103 causes the tracking image combination unit 111 to calculate the visible light side and non-visible light side weight values as the combination ratio of the visible light image data and the non-visible light image data for generation of the combined image data suitable for tracking processing by the tracking unit 120 and to store the calculated visible light side and non-visible light side weight values in the tracking memory 114.

At step S312, the camera control unit 103 causes the tracking image combination unit 111 to read the visible light image data, the non-visible light image data, the visible light side weight value, and the non-visible light side weight value from the tracking memory 114 and generate the combined image data. The camera control unit 103 also causes the tracking image combination unit 111 to read the tracking object area information from the tracking memory 114, produce, from the combined image data and the tracking object area information, track template information necessary for execution of tracking processing by the tracking unit 120 in the next frame, and store the produced track template information in the tracking memory 114. For example, in a case where tracking processing executed by the tracking unit 120 is feature point matching, the track template information is the feature amount of any feature point having intensity equal to or higher than a predetermined value in the tracking object area in the combined image data of the past frame. The feature point matching is a method of estimating the position of the tracking object area in the current frame by associating the feature amount of each feature point having intensity equal to or higher than the predetermined value between the past frame and the current frame.

At step S308, the camera control unit 103 causes the object determining unit 110 to read, from the tracking memory 114, the tracking object information in tracking and the object candidate area information detected by the detector 109 and determine whether to switch the tracking object based on the priority ranking setting. For example, switching to an object candidate area of the type "cat" is determined in a case where the tracking object is an object of the type "dog", the type "cat" is set to be higher than the type "dog" in the priority ranking, and an object candidate area with the object candidate area information indicating the type "cat" is detected. In a case where it is determined to switch the tracking object, the camera control unit 103 causes the object determining unit 110 to update information specifying the tracking object with the switched tracking object and store the updated information specifying the tracking object in the tracking memory 114. Then, the camera control unit 103 proceeds to step S309. In a case where it is determined not switches to the tracking object, the camera control unit 103 proceeds to step S310.

At step S310, the camera control unit 103 causes the tracking image combination unit 111 to read the visible light image data, the non-visible light image data, the visible light side weight value, and the non-visible light side weight value from the tracking memory 114 and generate the combined image data. Then, the camera control unit 103 causes the tracking image combination unit 111 to store the combined image data in the tracking memory 114.

At step S311, the camera control unit 103 causes the tracking unit 120 to read the track template information and the combined image data from the tracking memory 114 and execute tracking processing. In a case where tracking is successful when as a result of the tracking processing, the camera control unit 103 causes the object determining unit 110 to update the tracking object information such as the position and size of the tracking object area and store the updated tracking object information in the tracking memory 114. Then, the camera control unit 103 proceeds to step S313. In a case where the tracking processing is not successful, the camera control unit 103 proceeds to step S315.

At step S315, the camera control unit 103 causes the tracking unit 120 to cancel the tracking state.

At step S313, the camera control unit 103 causes the tracking image combination unit 111 to update the visible light side and non-visible light side weight values. In addition, the camera control unit 103 causes the tracking image combination unit 111 to read the tracking object information from the tracking memory 114, calculate the visible light side and non-visible light side weight values based on the tracking object information, and store the calculated visible light side and non-visible light side weight values in the tracking memory 114.

At step S314, the camera control unit 103 causes the display image superimposition unit 123 to read the tracking object information from the tracking memory 114 and generate a tracking frame image to be superimposed on the display image data displayed on the display unit 124. In this case, the camera control unit 103 may cause the display image superimposition unit 123 to read the visible light side and non-visible light side weight values from the tracking memory 114 and change the color and shape of the tracking frame based on these weight values. Accordingly, the user can be notified of which of the visible light image data and the non-visible light image data is more utilized in tracking processing being executed. Instead of changing the color and shape of the tracking frame, a frame image may be superimposed on the outer periphery of the display image data, the color of the outer peripheral frame may be changed, or the period of superimposition of the outer peripheral frame may be changed. In addition, an icon indicating the more utilized image data may be displayed, or the non-visible light side weight value may be displayed by an indicator.

FIG. 5 illustrates examples of a display image in which a tracking frame image and an information image are superimposed on the display image data. An automobile 501 in a display image 500 is the tracking object. In a case where tracking of the automobile 501 is successful, a tracking frame 502 in which square-bracket shapes are disposed at the four corners of a rectangle as a standard shape is displayed in a size enclosing the automobile 501 at the position of the automobile 501 in the display image 500.

In a case where the visible light side weight value is larger than the non-visible light side weight value, for example, red (R255, G0, B0 in 24-bitRGB) is used as the color of the tracking frame 502. In a case where the visible light side weight value is equal to or smaller than the non-visible light side weight value, for example, a tracking frame 503 in orange (R255, G140, B0 in 24-bitRGB) is displayed. A tracking frame 505 having a color that linearly changes from red to orange in accordance with change in the ratio of the visible light side and non-visible light side weights may be displayed. In a case where the visible light side weight value is equal to or smaller than the non-visible light side weight value, a tracking frame 504 in which doubly square-bracket shapes are disposed at the four corners of a rectangle may be displayed. Alternatively, in a case where the visible light side weight value is equal to or smaller than the non-visible light side weight value, an outer peripheral frame 506 in orange may be displayed at the outer periphery of the display image 500, or an outer peripheral frame 507 having a color that linearly changes from red to orange in accordance with change in the ratio of the visible light side and non-visible light side weights may be displayed. In a case where the visible light side weight value is equal to or smaller than the non-visible light side weight value, a frame with an outer peripheral frame displayed in superimposition and a frame with no outer peripheral frame displayed in superimposition may be alternately displayed in a predetermined period to have a flickering outer peripheral frame, and the flickering period may be changed in accordance with change in the ratio of the visible light side and non-visible light side weights. Moreover, in a case where the visible light side weight value is equal to or smaller than the non-visible light side weight value, an icon 508 indicating the case may be superimposed and displayed on the display image 500 or an indicator 509 displaying the non-visible light side weight value may be superimposed and displayed.

At step S314, the current frame is a frame in which the tracking object is determined by the object determining unit 110 or a frame in which the tracking object is switched (in other words, a frame in which the tracking object is not tracked) in some cases. In such a case, the camera control unit 103 causes the display image superimposition unit 123 to generate a tracking frame image based on the object candidate area information of an object candidate area including the tracking object and display a tracking frame in superimposition on a display image, thereby displaying determination or switching of the tracking object.

At step S316, the camera control unit 103 causes the display image superimposition unit 123 to output, to the display unit 124, the display image data on which the tracking frame 502, 503, 504, or 505, the outer peripheral frame 506 or 507, the icon 508, or the indicator 509, which are illustrated in FIG. 5, is superimposed.

At step S317, the camera control unit 103 causes the display unit 124 to display the display image data from the display image superimposition unit 123.

The above-described processing at steps S300 to S317 is repeated for each frame to determine the tracking object as an AF target and display a tracking frame while executing tracking processing.

The image pickup apparatus 100 may include a non-visible light source configured to emit non-visible light in a direction in which an object exists. In this case, the camera control unit 103 as a light source control unit may control the light emission quantity and light emission period of non-visible light emitted from the non-visible light source based on the non-visible light side weight value calculated at the tracking image combination unit 111. Accordingly, the intensity of reflected light from the object can be increased in the non-visible light to improve tracking processing performance of the tracking unit 120. A state in which the non-visible light side weight value is large is a state in which non-visible light is to be more utilized to track the object, and thus, for example, the light emission quantity of non-visible light to be emitted may be increased in proportion to increase of the non-visible light side weight value. Moreover, the light emission period of non-visible light to be emitted may be shortened in proportion to increase of the non-visible light side weight value. For example, in a case where the non-visible light side weight value has increased from 50 to 100, the light emission quantity of non-visible light may be doubled or the light emission period of non-visible light may be halved.

As described above, the tracking unit 120 may be constituted by an identifier configured to estimate the position and size of the tracking target object area by using a multi-layer neural network including a trained convolutional layer. In this case, the identifier may be operated with parameters trained by using only training visible light image data as training data or may be operated with parameters trained by using training non-visible light image data as training data. Alternatively, the identifier may be operated with parameters trained by using training combined image data as training data.

These operations may be switched by the tracking unit 120. For example, in a case where a value obtained by dividing the visible light side weight value calculated by the tracking image combination unit 111 by the summed value of the visible light side and non-visible light side weight values exceeds a first threshold value, the identifier may be operated with parameters trained by using only training visible light image data as training data. In a case where the above-described divided value exceeds a second threshold value larger than the first threshold value, the identifier may be operated with parameters trained by using training combined image data as training data. In other cases, the identifier may be operated with parameters trained by using only training non-visible light image data as training data.

In a case where the visible light side weight value calculated by the tracking image combination unit 111 is equal to or larger than the non-visible light side weight value, the identifier may be operated with parameters trained by using only training visible light image data as training data. In a case where the visible light side weight value is smaller than the non-visible light side weight value, the identifier may be operated with parameters trained by using only training non-visible light image data as training data. Tracking performance of the tracking unit 120 can be improved by using optimum trained parameters for the combined image data input to the tracking unit 120.

In the present example, as described above, the tracking image combination unit 111 generates the combined image data from the visible light image data and the non-visible light image data based on the result of detection by the detector 109. Then, the tracking unit 120 tracks the tracking object as an AF target by using the combined image data. Accordingly, tracking processing can be performed in accordance with visible light reflection characteristics and non-visible light reflection characteristics of the tracking object, and tracking performance can be improved.

Example 2

Example 2 will be described next. FIG. 4 illustrates the configuration of an image pickup apparatus 400 of Example 2. The image pickup apparatus 400 is the same as the image pickup apparatus 100 except that the detector 109 in the image pickup apparatus 100 of Example 1 is replaced with a first detector 425 configured to perform detection by using the visible light image data and with a second detector 426 configured to perform detection by using the non-visible light image data, and thus any constituent component common to Example 1 is denoted by the same reference sign as in Example 1 and description thereof is omitted.

Similarly to the detector 109 of Example 1, the first detector 425 detects the object candidate area information such as the type of an object candidate area from the visible light image data of one frame, and further identifies the background area and divided areas and stores the result of the identification in the tracking memory 114. The second detector 426 detects the object candidate area information such as the type of an object candidate area from the non-visible light image data of one frame, and further identifies the background area and divided areas and stores the result of the identification in the tracking memory 114. Based on difference between the detection results of the first detector 425 and the second detector 426, the tracking image combination unit 111 calculates the visible light side and non-visible light side weight values and generates the combined image data. Accordingly, tracking performance of the tracking unit 120 can be improved.

The tracking image combination unit 111 adds weight contribution values for each type of the background area, each type of a surrounding area of the tracking object, or each type of a surrounding object, which are illustrated in FIG. 7 to weight contribution values for each type of the tracking object, which are illustrated in FIG. 6. The tracking image combination unit 111 further adds weight contribution values based on the difference in the tracking object information detected by the first detector 425 and the second detector 426, which is illustrated in FIG. 9, thereby calculating the visible light side and non-visible light side weight values.

In the present example as well, the tracking image combination unit 111 uses the visible light side weight value of 50, the non-visible light side weight value of 50, and the summed value of 100 as basis weight values of combination. In a case where the priority object is "person", the type of the tracking object is "person (bright clothing)", and the background area is "night scene", the total number of object candidate areas of the type "person" detected by the first detector 425 is compared with the total number of object candidate areas of the type "person" detected by the second detector 426. In a case where the total number of object candidate areas of the type "person" detected by the first detector 425 is equal to or larger than the total number of object candidate areas of the type "person" detected by the second detector 426 and their difference is six, the visible light side weight contribution value of 10 and the non-visible light side weight contribution value of 0 are employed based on the type ID 601. In addition, the visible light side weight contribution value of 0 and the non-visible light side weight contribution value of 30 are employed based on the background area ID 701, and the visible light side weight contribution value of 5×6 (6 is the detection difference of "person") and the non-visible light side weight contribution value of 0 are employed based on a priority object number ID 901. Then, the visible light side weight contribution value of 40 is added to the visible light side weight value of 50 to set the visible light side weight value of 90, and the non-visible light side weight contribution value of 30 is added to the non-visible light side weight value to set the non-visible light side weight value of 80, thereby setting the summed value of 170.

As indicated in an equation below, the tracking image combination unit 111 multiplies the non-visible light image data and the visible light image data of each pixel by values obtained by dividing the respective weight values by the summed value and adds the multiplied values to generate the combined image data.

$$\text{Combined image data} = \text{visible light image data} \times (90/170) +$$
$$\text{non-visible light image data} \times (80/170)$$

In this example, the type of the tracking object is "person (bright clothing)", the background area is "night scene", and the total number of object candidate areas of the type "person" detected by the first detector 425 is equal to or larger than the total number of object candidate areas of the type "person" detected by the second detector 426 by the difference of 5. In this manner, the ratio of the visible light image data in the combined image data is increased, and tracking processing prioritizing the visible light image data can be achieved at the tracking unit 120.

In a case where the total number of object candidate areas of the type "person" detected by the first detector 425 is smaller than the total number of object candidate areas of the type "person" detected by the second detector 426 by the difference of 3, the tracking image combination unit 111 calculates the visible light side and non-visible light side weight contribution values as follows. Specifically, the visible light side weight contribution value of 0 and the non-visible light side weight contribution value of 5×3 (3 is the detection difference of "person") are employed based on a priority object number ID 902. Then, the combined image data is generated, and accordingly, the ratio of the non-visible light image data in the combined image data is increased and tracking processing prioritizing the non-visible light image data can be achieved at the tracking unit 120.

In a case where the priority object is "person", the tracking image combination unit 111 may employ the visible light side weight contribution value based on the number of object candidate areas of the type "person" detected by the first detector 425 and the second detector 426, respectively, instead of the difference of the detected numbers. Specifically, the visible light side weight contribution value of 5×6 (6 is the number of object candidate areas of the type "person" detected by the first detector 425) and the non-visible light side weight contribution value of 5×3 (3 is the number of object candidate areas of the type "person" detected by the second detector 426) are employed based on a priority object information ID 903. Then, the combined image data is generated by using these weight contribution values.

The tracking image combination unit 111 may employ the non-visible light side weight value based on whether the total number of object candidate areas of the type "person" detected by each of the first and second detectors 425 and 426 exceeds a predetermined threshold value. In a case where the total number of object candidate areas of the type "person" detected by the first detector 425 exceeds the threshold value, the visible light side weight value of 10 and the non-visible light side weight value of 10 are employed based on a priority object information ID 904. In a case where the threshold value is not exceeded, the visible light side weight value of 0 and the non-visible light side weight value of 0 are employed.

Moreover, the tracking image combination unit 111 may employ the visible light side and non-visible light side weight values based on the type of the priority object and the number of object candidate areas of the same type as the priority object among object candidate areas detected by each of the first and second detectors 425 and 426. Accordingly, tracking performance of the tracking unit 120 can be improved.

The following describes a case where weight contribution values for any of the type of the background area, the type of a surrounding area of the tracking object, and the type of a surrounding object, which are illustrated in FIG. 7 are added to weight contribution values for each type of the tracking object, which are illustrated in FIG. 6, and weight contribution values in accordance with detection difference in the tracking object information, which are illustrated in FIG. 10 are further added. The detection difference in the tracking object information is the difference in the tracking object information detected by the first and second detectors 425 and 426.

In this case as well, the tracking image combination unit 111 uses the visible light side weight value of 50, the non-visible light side weight value of 50, and the summed value of 100 as basis weight values of combination. In a case where the type of the tracking object is "person (bright clothing)", the background area is "evening scene", and the luminance dispersion value of the tracking object area detected by the first detector 425 is equal to or larger than that of the tracking object area detected by the second detector 426, the tracking image combination unit 111 employs weight contribution values as follows. Specifically, the visible light side weight contribution value of 10 and the non-visible light side weight contribution value of 0 are employed based on the type ID 601, and the visible light side weight contribution value of 0 and the non-visible light side weight contribution value of 10 are employed based on the background area ID 702. In addition, the visible light side weight contribution value of 10 and the non-visible light side weight contribution value of 0 are employed based on tracking object information ID 1001. Then, the tracking image combination unit 111 adds the visible light side weight contribution value of 30 to the visible light side weight value of 50 to set the visible light side weight value of 70, adds the non-visible light side weight contribution value of 10 to the non-visible light side weight value of 50 to set the non-visible light side weight value of 60, thereby setting the summed value of 130.

As indicated in an equation below, the tracking image combination unit 111 multiplies the non-visible light image data and the visible light image data of each pixel by values obtained by dividing the respective weight values by the summed value and adds the multiplied values to generate the combined image data.

$$\text{Combined image data} = \text{visible light image data} \times (70/130) +$$
$$\text{non-visible light image data} \times (60/130)$$

The generation of the combined image data with the above-described expression increases the ratio of the visible light image data in the combined image data in the above-described case, and tracking processing prioritizing the visible light image data can be achieved at the tracking unit 120. In a case where the luminance dispersion value of the tracking object area detected by the first detector 425 is smaller than that of the tracking object area detected by the second detector 426, the tracking image combination unit 111 employs the visible light side weight contribution value of 0 and the non-visible light side weight contribution value of 10 based on a tracking object information ID 1002. Then, the combined image data is generated by using these weight contribution values, and accordingly, the ratio of the non-visible light image data in the combined image data is increased and tracking processing prioritizing the non-visible light image data can be achieved at the tracking unit 120.

In a case where the amplitude average of the tracking object area detected by the first detector 425 at a spatial frequency equal to or higher than a predetermined frequency is equal to or larger than that of the tracking object area detected by the second detector 426, the tracking image combination unit 111 employs the visible light side weight contribution value of 20 and the non-visible light side weight contribution value of 0 based on a tracking object information ID 1003. In a case where the amplitude average of the tracking object area detected by the first detector 425 at a spatial frequency equal to or higher than the predetermined frequency is smaller than that of the tracking object area detected by the second detector 426, the tracking image combination unit 111 employs the visible light side weight contribution value of 0 and the non-visible light side weight contribution value of 20 based on a tracking object information ID 1004.

In a case where the number of edge pixels with edge intensity equal to or higher than a predetermined edge intensity in the tracking object area detected by the first detector 425 is equal to or larger than that in the tracking object area detected by the second detector 426, the visible light side weight contribution value of 10 and the non-visible light side weight contribution value of 0 are employed based on a tracking object information ID 1005. In a case where the number of edge pixels with edge intensity equal to or higher than predetermined edge intensity in the tracking object area detected by the first detector 425 is smaller than that in the tracking object area detected by the second detector 426, the visible light side weight contribution value of 0 and the non-visible light side weight contribution value of 10 are employed based on a tracking object information ID 1006.

In a case where the number of feature points with intensity equal to or higher than a predetermined intensity in the tracking object area detected by the first detector 425 is equal to or larger than that in the tracking object area detected by the second detector 426, the visible light side weight contribution value of 20 and the non-visible light side weight contribution value of 0 are employed based on a tracking object information ID 1007. In a case where the number of feature points with intensity equal to or higher than predetermined intensity in the tracking object area detected by the first detector 425 is smaller than that in the tracking object area detected by the second detector 426, the visible light side weight contribution value of 0 and the non-visible light side weight contribution value of 20 are employed based on a tracking object information ID 1008. Then, the combined image data is generated by using these weight contribution values.

In this manner, the tracking image combination unit 111 calculates the visible light side and non-visible light side weight values based on the tracking object area information detected by each of the first and second detectors 425 and 426 and generates the combined image data based on the calculated weight values. Accordingly, tracking performance of the tracking unit 120 can be improved.

In the present example, as described above, the tracking image combination unit 111 generates the combined image data from the visible light image data and the non-visible light image data based on the results of detection by the first and second detectors 425 and 426. Then, the tracking unit 120 tracks the tracking object as an AF target by using the combined image data. Accordingly, tracking processing can be performed in accordance with visible light reflection characteristics and non-visible light reflection characteristics of the tracking object, and tracking performance can be improved.

Example 3

In the present example and subsequent examples, description will be made of a case where imaging rate and imaging timing are different between the first image sensor 105 and the second image sensor 106. The imaging rate is controlled by the camera control unit 103 based on the exposure time of the first image sensor 105 and the exposure time of the second image sensor 106. The imaging timing is controlled by the camera control unit 103 based on a reference timing as a frequency that is a common multiple of the imaging rate of the first image sensor 105 and the imaging rate of the second image sensor 106. Generation of the visible light image data and the non-visible light image data is simultaneously completed at a timing, and generation of the visible light image data only is completed or generation of the non-visible light image data only is completed at another timing. Thus, even if the imaging rates of the first image sensor 105 and the second image sensor 106 are different from each other, control is performed so that the imaging timings coincide with each other in a predetermined period. In the present example and subsequent examples, the camera control unit 103 corresponds to an imaging controller.

In Example 3, in a case where the imaging rate and the imaging timing are different between the first image sensor 105 and the second image sensor 106, the combined image data is generated by combining the visible light image data and the non-visible light image data and the tracking unit 120 tracks an AF target object by using the combined image data.

Flowcharts in FIGS. 12A and 12B illustrate processing (image processing method) executed by the camera control unit 103 in accordance with a computer program to determine and track an AF target object and display a tracking frame.

Processing at steps S1200 to S1209 and steps S1210 to S1217 is the same as the processing at steps S300 to S309 and steps S310 to S317, respectively, in FIGS. 3A and 3B.

After having started processing from step S1200, the camera control unit 103 causes, in parallel to the processing, the second image sensor 106 to photoelectrically convert only non-visible light formed through the second optical system 102 and generate the visible light image data at step S1218. Since a filter that transmits only non-visible light (near-infrared light) is disposed on the imaging plane of the second image sensor 106, the second image sensor 106 photoelectrically converts only non-visible light.

At step S1219, the camera control unit 103 causes the third preprocessing unit 112 to perform, on the non-visible light image data, filter processing and scaling-down processing that reduces the number of pixels.

At step S1220, the camera control unit 103 writes the non-visible light image data processed by the third preprocessing unit 112 to the tracking memory 114.

At step S1221, the camera control unit 103 causes the evaluation value generator 104 to calculate AF and AE evaluation values from the non-visible light image data. As described above, the evaluation value generator 104 uses at least one of the visible light image data from the first image sensor 105 and the non-visible light image data from the second image sensor 106.

At step S1222, the camera control unit 103 determines whether all necessary image processing is completed. The camera control unit 103 proceeds to step S1206 in a case where all image processing is completed, or returns to step S1220 in a case where not all image processing is completed.

The camera control unit 103 proceeds to step S1223 after step S1209. The camera control unit 103 proceeds to step S1224 in a case where it is determined not to switch the tracking object at step S1208.

At steps S1223 and S1224, the camera control unit 103 determines whether the imaging timings of the visible light image data and the non-visible light image data coincide with each other. The coinciding imaging timings include not only completely coinciding imaging timings but also imaging timings with a predetermined time difference in which the combined image data to be used for object tracking can be generated. Thus, at the present step, it is determined whether the difference between the imaging timings of the visible light image data and the non-visible light image data is equal to or smaller than the predetermined time difference. This is also the same in other examples to be described later.

In a case where the imaging timings coincide with each other, the camera control unit 103 proceeds to steps S1212 and S1210 along the respective flow paths. In a case where the imaging timings do not coincide with each other, the camera control unit 103 repeats the determination at steps S1223 and S1224 along the respective flow paths.

In the present example, as described above, in a case where the imaging rate and the imaging timing are different between the first image sensor 105 and the second image sensor 106, the tracking image combination unit 111 generates the combined image data from the visible light image data and the non-visible light image data based on the result of detection by the detector 109. Then, the tracking unit 120 tracks the tracking object as an AF target by using the combined image data. Accordingly, tracking processing can be performed in accordance with visible light reflection characteristics and non-visible light reflection characteristics of the tracking object, and tracking performance can be improved.

Example 4

In the following example, the camera control unit 103 selects whether to cause the tracking unit 120 to track the tracking object by using only the combined image data or track the tracking object by using the combined image data and one of the visible light image data and the non-visible light image data.

In Example 4, in a case where the imaging rate and the imaging timing are different between the first image sensor 105 and the second image sensor 106, the tracking unit 120 tracks the tracking object as an AF target by using the combined image data and image data with a larger weight among the visible light image data and the non-visible light image data. The weights are the visible light side and non-visible light side weight values described above in Examples 1 and 2. Alternatively, the weight of image data with a higher imaging rate may be set larger.

Flowcharts in FIGS. 13A and 13B illustrate processing (image processing method) executed by the camera control unit 103 in accordance with a computer program to determine and track an AF target object and display a tracking frame.

Processing at steps S1300 to S1309 and steps S1310 to S1317 is the same as the processing at steps S1200 to S1209 and steps S1210 to S1217, respectively, in FIGS. 12A and 12B. In addition, processing at steps S1318 to S1322 is the same as the processing at steps S1218 to S1222 in FIGS. 12A and 12B.

The camera control unit 103 proceeds to step S1323 after step S1309. The camera control unit 103 proceeds to step S1324 in a case where it is determined not to switch the tracking object at step S1308.

At steps S1323 and S1324, the camera control unit 103 determines whether the imaging timings of the visible light image data and the non-visible light image data coincide with each other. In a case where the imaging timings coincide with each other, the camera control unit 103 proceeds to steps S1312 and S1310 along the respective flow path. In a case where the imaging timings do not coincide with each other, the camera control unit 103 proceeds to steps S1325 and S1326 along the respective flow paths.

At steps S1325 and S1326, the camera control unit 103 determines whether image data with a larger weight exists alone among the visible light image data and the non-visible light image data. In a case where image data with a larger weight exists, the camera control unit 103 proceeds to steps S1312 and S1310 along the respective flow paths. In a case where no image data with a larger weight exists, the camera control unit 103 returns to steps S1323 and S1324 along the respective flow paths.

In the present example, as described above, in a case where the imaging rate and the imaging timing are different between the first image sensor 105 and the second image sensor 106, the tracking image combination unit 111 generates the combined image data from the visible light image data and the non-visible light image data based on the result of detection by the detector 109. Then, the tracking unit 120 tracks the tracking object as an AF target by using the combined image data. Accordingly, tracking processing is performed in accordance with visible light reflection characteristics and non-visible light reflection characteristics of the tracking object. Moreover, in a case where image data with a larger weight exists alone, the tracking object is tracked by using the image data so that it is possible to responsively track the tracking object while keeping tracking performance.

Example 5

In the present example, in a case where the imaging rate and the imaging timing are different between the first image sensor 105 and the second image sensor 106, the tracking unit 120 tracks the tracking object as an AF target by using the combined image data and image data with a higher imaging rate among the visible light image data and the non-visible light image data.

Flowcharts in FIGS. 14A and 14B illustrate processing (image processing method) executed by the camera control unit 103 in accordance with a computer program to determine and track an AF target object and display a tracking frame.

Processing at steps S1400 to S1409 and steps S1410 to S1417 is the same as the processing at steps S1200 to S1209 and steps S1210 to S1217, respectively, in FIGS. 12A and 12B. In addition, processing at steps S1418 to S1422 is the same as the processing at steps S1218 to S1222, respectively, in FIGS. 12A and 12B.

The camera control unit 103 proceeds to step S1423 after step S1409. The camera control unit 103 proceeds to step S1424 in a case where it is determined not to switch the tracking object at step S1408.

At steps S1423 and S1424, the camera control unit 103 determines whether the imaging timings of the visible light image data and the non-visible light image data coincide with each other. In a case where the imaging timings coincide with each other, the camera control unit 103 proceeds to steps S1412 and S1410 along the respective flow path. In a case where the imaging timings do not coincide with each other, the camera control unit 103 proceeds to steps S1425 and S1426 along the respective flow paths.

At steps S1425 and S1426, the camera control unit 103 determines whether image data with a higher imaging rate exists alone among the visible light image data and the non-visible light image data. In a case where image data with a higher imaging rate exists, the camera control unit 103 proceeds to steps S1412 and S1410 along the respective flow paths. In a case where no image data with a higher imaging rate exists, the camera control unit 103 returns to steps S1423 and S1424 along the respective flow paths.

In the present example, as described above, in a case where the imaging rate and the imaging timing are different between the first image sensor 105 and the second image sensor 106, the tracking image combination unit 111 generates the combined image data from the visible light image data and the non-visible light image data based on the result of detection by the detector 109. Then, the tracking unit 120 tracks the tracking object as an AF target by using the combined image data. Accordingly, tracking processing is performed in accordance with visible light reflection characteristics and non-visible light reflection characteristics of the tracking object. Moreover, in a case where image data with a higher imaging rate exists alone, the tracking object is tracked by using the image data so that it is possible to responsively track the tracking object while keeping tracking performance.

Example 6

In the present example, in a case where the imaging rate and the imaging timing are different between the first image sensor 105 and the second image sensor 106, the tracking unit 120 tracks the tracking object as an AF target by using the combined image data, the visible light image data, and the non-visible light image data.

Flowcharts in FIGS. 15A and 15B illustrate processing (image processing method) executed by the camera control unit 103 in accordance with a computer program to determine and track an AF target object and display a tracking frame.

Processing at steps S1500 to S1509 and steps S1510 to S1517 is the same as the processing at steps S1200 to S1209 and steps S1210 to S1217, respectively, in FIGS. 12A and 12B. In addition, processing at steps S1518 to S1522 is the same as the processing at steps S1218 to S1222, respectively, in FIGS. 12A and 12B.

The camera control unit 103 proceeds to step S1523 after step S1509. The camera control unit 103 proceeds to step S1524 in a case where it is determined not to switch the tracking object at step S1508.

At steps S1523 and S1524, the camera control unit 103 determines whether the imaging timings of the visible light image data and the non-visible light image data coincide with each other. In a case where the imaging timings coincide with each other, the camera control unit 103 proceeds to steps S1412 and S1410 along the respective flow path. In a case where the imaging timings do not coincide with each other, the camera control unit 103 proceeds to steps S1525 and S1526 along the respective flow paths.

At steps S1525 and S1526, the camera control unit 103 determines whether either of the visible light image data and the non-visible light image data exists alone. In a case where either image data exists, the camera control unit 103 proceeds to steps S1512 and S1510 along the respective flow paths. In a case where no image data exists, the camera control unit 103 returns to steps S1523 and S1524 along the respective flow paths.

In the present example, as described above, in a case where the imaging rate and the imaging timing are different between the first image sensor 105 and the second image sensor 106, the tracking image combination unit 111 generates the combined image data from the visible light image data and the non-visible light image data based on the result of detection by the detector 109. Then, the tracking unit 120 tracks the tracking object as an AF target by using the combined image data. Accordingly, tracking processing is performed in accordance with visible light reflection characteristics and non-visible light reflection characteristics of the tracking object. Moreover, in a case where image data exists alone, the tracking object is tracked by using the image data so that it is possible to responsively track the tracking object while keeping tracking performance.

While the disclosure has described example embodiments, it is to be understood that some embodiments are not limited to the disclosed embodiments. The scope of the following claims is to be accorded the broadest interpretation so as to encompass all such modifications and equivalent structures and functions.

What is claimed is:

1. An image processing apparatus comprising:
   a detector configured to detect at least one object included in at least one of visible light image data and non-visible light image data that are generated by imaging; and
   a processor configured to:
   determine a tracking object from the at least one object;
   generate combined image data by combining the visible light image data and the non-visible light image data; and
   track the tracking object by using the combined image data,
   wherein the processor combines the visible light image data and the non-visible light image data in accordance with information related to the at lease one object detected by the detector,
   wherein a priority object can be set by a user,
   wherein, in a case where the tracking object and the priority object are different from each other, the processor sets a combination ratio of the visible light image data and the non-visible light image data in accordance with information related to the priority object as the information, and
   wherein the processor sets the combination ratio based on a result of comparison between the information acquired from the visible light image data and the information acquired from the non-visible light image data.

2. The image processing apparatus according to claim 1, wherein the information includes information related to type of the tracking object.

3. The image processing apparatus according to claim 2, wherein the information includes information related to at least one of position, size, color, luminance, spatial frequency, edge position, and feature point position of the tracking object.

4. The image processing apparatus according to claim 3, wherein the information includes information related to at least one of type of a background of the tracking object, type of an area around the tracking object, and type of an object around the tracking object.

5. The image processing apparatus according to claim 1, wherein the detector selects image data from which the at least one object is to be detected from among the visible light image data and the non-visible light image data based on the result of comparison between the information acquired from the visible light image data and the information acquired from the non-visible light image data.

6. The image processing apparatus according to claim 1, wherein same image data is input to the detector and the processor in a frame in which the processor tracks the tracking object.

7. The image processing apparatus according to claim 1, wherein the processor acquires a number of priority objects, which is set by the user as the information, from each of the visible light image data and the non-visible light image data, and sets the combination ratio based on a result of comparison between the numbers.

8. The image processing apparatus according to claim 1, wherein the processor is able to track the tracking object by using at least two parameters among a parameter obtained by machine learning that uses training visible light image data as training data, a parameter obtained by machine learning that uses training non-visible light image data as training data, and a parameter obtained by machine learning that uses training combined image data as training data, and wherein the parameter to be used for tracking is selected by using the combination ratio of the visible light image data and the non-visible light image data, which is set by the processor.

9. The image processing apparatus according to claim 1, further comprising a light source controller configured to control a light source that emits non-visible light toward the tracking object, wherein the light source controller controls the light source based on the combination ratio of the visible light image data and the non-visible light image data, which is set by the processor.

10. The image processing apparatus according to claim 1, further comprising a display controller configured to cause a display unit to display information indicating the combination ratio of the visible light image data and the non-visible light image data, which is set by the processor.

11. The image processing apparatus according to claim 1, further comprising an imaging controller configured to perform control imaging so that imaging for generating visible light image data and imaging for generating non-visible light image data are performed at mutually different imaging rates, and so that a time difference between an imaging timing of the visible light image data and an imaging timing of the non-visible light image data becomes smaller than a predetermined time difference in a predetermined period, wherein the imaging controller causes the processor to generate the combined image data from the visible light image data and the non-visible light image data when the time difference between the imaging timings becomes smaller than the predetermined time difference, and causes the processor to track the tracking object by using the combined image data.

12. The image processing apparatus according to claim 11, wherein in a case where the time difference between the imaging timings is not smaller than the predetermined time difference, the imaging controller causes the processor to track the tracking object by using the combined image data and one of the visible light image data and the non-visible light image data.

13. The image processing apparatus according to claim 12, wherein in a case where the time difference between the imaging timings is not smaller than the predetermined time difference and image data that the combination ratio thereof is larger exists among the visible light image data and the non-visible light image data, the imaging controller causes the processor to track the tracking object by using the combined image data and the image data of the larger combination ratio.

14. The image processing apparatus according to claim 12, wherein in a case where the time difference between the imaging timings is not smaller than the predetermined time difference and image data that the imaging rate thereof is larger exists among the visible light image data and the non-visible light image data, the imaging controller causes the processor to track the tracking object by using the combined image data and the image data of the larger imaging rate.

15. The image processing apparatus according to claim 12, wherein in a case where the time difference between the imaging timings is not smaller than the predetermined time difference and any one image data of the visible light image data and the non-visible light image data exists, the imaging controller causes the processor to track the tracking object by using the combined image data and the one image data.

16. An image pickup apparatus comprising:

the image processing apparatus according to claim 1; and an imaging unit configured to generate the visible light image data and the non-visible light image data by imaging.

17. An image processing method comprising:

detecting at least one object based on at least one of visible light image data and non-visible light image data that are generated by imaging;

determining a tracking object from the at least one object;

generating combined image data by combining the visible light image data and the non-visible light image data; and tracking the tracking object by using the combined image data, wherein the visible light image data and the non-visible light image data are combined in accordance with information related to the detected object, wherein a priority object can be set by a user, wherein, in a case where the tracking object and the priority object are different from each other, a combination ratio of the visible light image data and the non-visible light image data is set in accordance with information related to the priority object as the information, and wherein the combination ratio is set based on a result of comparison between the information acquired from the visible light image data and the information acquired from the non-visible light image data.

18. A non-transitory computer-readable storage medium storing a program that causes a computer to execute processing in accordance with the image processing method according to claim 17.

* * * * *